US010678637B2

(12) United States Patent
Balasubramanian et al.

(10) Patent No.: US 10,678,637 B2
(45) Date of Patent: Jun. 9, 2020

(54) TECHNIQUES TO IMPROVE DATA TRANSFER RELIABILITY

(71) Applicant: QUALCOMM Incorporated, San Diego, CA (US)

(72) Inventors: Srinivasan Balasubramanian, San Diego, CA (US); Leena Zacharias, San Jose, CA (US); Aziz Gholmieh, Del Mar, CA (US); Yue Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 15/650,343

(22) Filed: Jul. 14, 2017

(65) Prior Publication Data

US 2018/0196715 A1 Jul. 12, 2018

Related U.S. Application Data

(60) Provisional application No. 62/444,729, filed on Jan. 10, 2017.

(51) Int. Cl.
*G06F 11/10* (2006.01)
*G06F 11/20* (2006.01)
(Continued)

(52) U.S. Cl.
CPC ...... *G06F 11/1076* (2013.01); *G06F 11/2094* (2013.01); *G06F 11/2097* (2013.01);
(Continued)

(58) Field of Classification Search
CPC ............. G06F 11/1076; G06F 11/1443; G06F 16/184; G06F 16/70; G06F 11/2097;
(Continued)

(56) References Cited

U.S. PATENT DOCUMENTS 5,991,286 A * 11/1999 Labonte ................ H04L 1/0003
370/337
8,327,234 B2 * 12/2012 Earnshaw ................. H04L 1/20
714/780

(Continued)

FOREIGN PATENT DOCUMENTS

EP 1543644 A1 6/2005

OTHER PUBLICATIONS

International Search Report and Written Opinion—PCT/US2018/012973—ISA/EPO—Jul. 3, 2018.

*Primary Examiner* — Ivan O Latorre
(74) *Attorney, Agent, or Firm* — Holland & Hart

(57) ABSTRACT

Techniques are described herein to dynamically control a number of hybrid automatic repeat requests (HARQ) transmissions based at least in part on flow characteristics of a data flow. Data included in a transport block may be grouped into one or more data flows based on a variety of factors. A set of performance benchmarks may be associated with each data flow. Flow characteristics for each data flow may be measured. A network entity may determine a number of HARQ transmissions to be transmitted during a HARQ procedure based on measured flow characteristics satisfying the performance benchmarks. For example, if a performance benchmark is not satisfied by its associated flow characteristic, the network entity may request additional HARQ transmissions during the HARQ procedure.

34 Claims, 21 Drawing Sheets

(51) Int. Cl.

| | | |
|---|---|---|
| *H04L 29/06* | (2006.01) | |
| *H04L 29/08* | (2006.01) | |
| *H04L 29/14* | (2006.01) | |
| *H04N 21/218* | (2011.01) | |
| *H04N 21/231* | (2011.01) | |
| *H04N 21/2312* | (2011.01) | |
| *H04N 21/2315* | (2011.01) | |
| *H04N 21/232* | (2011.01) | |
| *H04N 21/239* | (2011.01) | |
| *H04N 21/24* | (2011.01) | |
| *H04N 21/241* | (2011.01) | |
| *H04N 21/262* | (2011.01) | |
| *H04N 21/44* | (2011.01) | |
| *H04N 21/442* | (2011.01) | |
| *H04N 21/472* | (2011.01) | |
| *H04N 21/658* | (2011.01) | |
| *H04N 21/845* | (2011.01) | |
| *H04N 7/173* | (2011.01) | |
| *G06F 16/70* | (2019.01) | |
| *G06F 16/182* | (2019.01) | |
| *H04L 1/18* | (2006.01) | |
| *G06F 11/16* | (2006.01) | |
| *H04L 1/00* | (2006.01) | |
| *G06F 11/14* | (2006.01) | |

(52) U.S. Cl.
CPC ............ *G06F 16/184* (2019.01); *G06F 16/70* (2019.01); *H04L 1/1825* (2013.01); *H04L 1/1887* (2013.01); *H04L 65/4084* (2013.01); *H04L 67/1095* (2013.01); *H04L 67/1097* (2013.01); *H04L 69/40* (2013.01); *H04N 7/17336* (2013.01); *H04N 21/2182* (2013.01); *H04N 21/232* (2013.01); *H04N 21/2312* (2013.01); *H04N 21/2315* (2013.01); *H04N 21/2393* (2013.01); *H04N 21/2396* (2013.01); *H04N 21/23103* (2013.01); *H04N 21/23116* (2013.01); *H04N 21/241* (2013.01); *H04N 21/2405* (2013.01); *H04N 21/262* (2013.01); *H04N 21/442* (2013.01); *H04N 21/44004* (2013.01); *H04N 21/47202* (2013.01); *H04N 21/6581* (2013.01); *H04N 21/8456* (2013.01); *G06F 11/1443* (2013.01); *G06F 11/1662* (2013.01); *G06F 2211/1028* (2013.01); *H04L 1/0003* (2013.01); *H04L 1/0009* (2013.01); *H04L 1/1877* (2013.01)

(58) Field of Classification Search
CPC ............. G06F 11/2094; G06F 11/1662; G06F 2211/1028; H04L 1/1877; H04L 1/1825; H04L 1/1887; H04L 65/4084; H04L 69/40; H04L 67/1097; H04L 67/1095; H04L 1/0009; H04L 1/0003; H04N 21/8456; H04N 21/6581; H04N 21/47202; H04N 21/442; H04N 21/44004; H04N 21/262; H04N 21/241; H04N 21/2405; H04N 21/2396; H04N 21/2393; H04N 21/232; H04N 21/2315; H04N 21/2312; H04N 21/23116; H04N 21/23103; H04N 21/2182; H04N 7/17336
See application file for complete search history.

(56) References Cited

U.S. PATENT DOCUMENTS

| | | | |
|---|---|---|---|
| 9,769,805 B2* | 9/2017 | Bergstrom | H04W 72/1242 |
| 2006/0030323 A1* | 2/2006 | Ode | H04W 36/30 |
| | | | 455/436 |
| 2006/0059399 A1* | 3/2006 | Hu | H04L 1/0017 |
| | | | 714/748 |
| 2006/0168504 A1* | 7/2006 | Meyer | H04L 1/0026 |
| | | | 714/799 |
| 2007/0058735 A1* | 3/2007 | Ghosh | H04L 25/0202 |
| | | | 375/260 |
| 2009/0103511 A1* | 4/2009 | Marinier | H04L 47/36 |
| | | | 370/345 |
| 2009/0116420 A1* | 5/2009 | Jeong | H04B 7/2606 |
| | | | 370/312 |
| 2009/0215442 A1* | 8/2009 | Lindoff | H04B 1/036 |
| | | | 455/423 |
| 2009/0307554 A1* | 12/2009 | Marinier | H04L 1/1812 |
| | | | 714/748 |
| 2009/0313516 A1* | 12/2009 | Shin | H04L 1/0003 |
| | | | 714/748 |
| 2010/0223534 A1* | 9/2010 | Earnshaw | H03M 13/1505 |
| | | | 714/780 |
| 2011/0099446 A1* | 4/2011 | Murakami | H04L 1/0041 |
| | | | 714/748 |
| 2011/0286449 A1* | 11/2011 | Ichino | H04L 1/1874 |
| | | | 370/389 |
| 2013/0039292 A1* | 2/2013 | Liu | H04L 1/1893 |
| | | | 370/329 |
| 2013/0114401 A1* | 5/2013 | Martin | H04L 1/0001 |
| | | | 370/225 |
| 2013/0163444 A1* | 6/2013 | Tee | H04L 69/40 |
| | | | 370/252 |
| 2013/0195008 A1* | 8/2013 | Pelletier | H04B 7/0417 |
| | | | 370/328 |
| 2014/0036856 A1* | 2/2014 | Park | H04L 1/1671 |
| | | | 370/329 |
| 2014/0119212 A1* | 5/2014 | Rahman | H04W 24/10 |
| | | | 370/252 |
| 2015/0135024 A1* | 5/2015 | Cavemi | H04L 1/1874 |
| | | | 714/704 |
| 2016/0164643 A1* | 6/2016 | Loehr | H04L 1/1854 |
| | | | 370/336 |
| 2016/0285589 A1* | 9/2016 | Mukkavilli | H04L 1/0041 |
| 2016/0337072 A1* | 11/2016 | Yang | H04W 72/0413 |
| 2017/0099128 A1* | 4/2017 | Gao | H04L 1/18 |
| 2018/0310308 A1* | 10/2018 | Loehr | H04W 72/0453 |

* cited by examiner

TECHNIQUES TO IMPROVE DATA TRANSFER RELIABILITY

CROSS REFERENCE

The present Application for patent claims priority to U.S. Provisional Patent Application No. 62/444,729 by Balasubramanian, et al., entitled "TECHNIQUES TO IMPROVE RELIABILITY IN UNACKNOWLEDGED MODE," filed Jan. 10, 2017, assigned to the assignee hereof.

INTRODUCTION

The following relates generally to wireless communication, and more specifically to techniques to improve data transfer reliability.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communication systems, data may fail to arrive successfully at its intended destination. To avoid data loss, wireless communication systems may employ error correction procedures such as a hybrid automatic repeat request (HARM) procedure at the media access control (MAC) layer or automatic repeat requests (ARQ) at the radio link control (RLC) layer. In some modes of operation (e.g., an unacknowledged mode), ARQ may not be used to correct errors.

SUMMARY

A method of wireless communication is described. The method may include identifying a flow characteristic of a data flow communicated during a transmission period comprising more than one frame, identifying a performance threshold based at least in part on the flow characteristic, and initiating a retransmission of a transport block based at least in part on satisfying the performance threshold.

An apparatus for wireless communication is described. The apparatus may include means for identifying a flow characteristic of a data flow communicated during a transmission period comprising more than one frame, means for identifying a performance threshold based at least in part on the flow characteristic, and means for initiating a retransmission of a transport block based at least in part on satisfying the performance threshold.

Another apparatus for wireless communication is described. The apparatus may include a processor, memory in electronic communication with the processor, and instructions stored in the memory. The instructions may be operable to cause the processor to identify a flow characteristic of a data flow communicated during a transmission period comprising more than one frame, identify a performance threshold based at least in part on the flow characteristic, and initiate a retransmission of a transport block based at least in part on satisfying the performance threshold.

A non-transitory computer readable medium for wireless communication is described. The non-transitory computer-readable medium may include instructions operable to cause a processor to identify a flow characteristic of a data flow communicated during a transmission period comprising more than one frame, identify a performance threshold based at least in part on the flow characteristic, and initiate a retransmission of a transport block based at least in part on satisfying the performance threshold.

Some examples of the method, apparatus, and non-transitory computer-readable medium described above may further include processes, features, means, or instructions for determining that a time duration remaining during the transmission period may be less than the performance threshold, wherein initiating the retransmission of the transport block may be based at least in part on the time duration being less than the performance threshold.

Some examples of the method, apparatus, and non-transitory computer-readable medium described above may further include processes, features, means, or instructions for determining that a number of transmissions of the transport block during the transmission period may be less than the performance threshold, wherein initiating the retransmission of the transport block may be based at least in part on the number of transmissions being less than the performance threshold.

In some examples of the method, apparatus, and non-transitory computer-readable medium described above, the transport block may be retransmitted after the transmission period may have ended.

In some examples of the method, apparatus, and non-transitory computer-readable medium described above, the flow characteristic includes jitter.

In some examples of the method, apparatus, and non-transitory computer-readable medium described above, the flow characteristic includes packet error rate.

In some examples of the method, apparatus, and non-transitory computer-readable medium described above, the flow characteristic includes time-delay.

In some examples of the method, apparatus, and non-transitory computer-readable medium described above, the flow characteristic includes throughput.

In some examples of the method, apparatus, and non-transitory computer-readable medium described above, initiating the retransmission of the transport block further comprises: transmitting a grant of resources to be used to retransmit the transport block based at least in part on satisfying the performance threshold.

Some examples of the method, apparatus, and non-transitory computer-readable medium described above may further include processes, features, means, or instructions for receiving the transport block during the transmission period, wherein identifying the flow characteristic may be based at least in part on the received transport block.

Some examples of the method, apparatus, and non-transitory computer-readable medium described above may further include processes, features, means, or instructions for determining that the transport block failed to be successfully decoded, wherein identifying the performance threshold may be based at least in part on the transport block failing to be successfully decoded.

In some examples of the method, apparatus, and non-transitory computer-readable medium described above, initiating the retransmission of the transport block further comprises: retransmitting the transport block based at least in part on satisfying the performance threshold.

Some examples of the method, apparatus, and non-transitory computer-readable medium described above may further include processes, features, means, or instructions for transmitting the transport block during the transmission period, wherein identifying the flow characteristic may be based at least in part on the transmitted transport block.

A method of wireless communication is described. The method may include receiving a transport block during a transmission period comprising more than one frame, measuring a flow characteristic of a data flow communicated during the transmission period as part of a hybrid automatic repeat request (HARQ), the measuring being based at least in part on the transport block failing to be successfully decoded, and transmitting a message indicating the flow characteristic to a base station.

An apparatus for wireless communication is described. The apparatus may include means for receiving a transport block during a transmission period comprising more than one frame, means for measuring a flow characteristic of a data flow communicated during the transmission period as part of a hybrid automatic repeat request (HARQ), the measuring being based at least in part on the transport block failing to be successfully decoded, and means for transmitting a message indicating the flow characteristic to a base station.

Another apparatus for wireless communication is described. The apparatus may include a processor, memory in electronic communication with the processor, and instructions stored in the memory. The instructions may be operable to cause the processor to receive a transport block during a transmission period comprising more than one frame, measure a flow characteristic of a data flow communicated during the transmission period as part of a hybrid automatic repeat request (HARQ), the measuring being based at least in part on the transport block failing to be successfully decoded, and transmit a message indicating the flow characteristic to a base station.

A non-transitory computer readable medium for wireless communication is described. The non-transitory computer-readable medium may include instructions operable to cause a processor to receive a transport block during a transmission period comprising more than one frame, measure a flow characteristic of a data flow communicated during the transmission period as part of a hybrid automatic repeat request (HARQ), the measuring being based at least in part on the transport block failing to be successfully decoded, and transmit a message indicating the flow characteristic to a base station.

In some examples of the method, apparatus, and non-transitory computer-readable medium described above, the flow characteristic includes: jitter, packet error rate, time-delay, throughput, or combinations thereof.

Some examples of the method, apparatus, and non-transitory computer-readable medium described above may further include processes, features, means, or instructions for determining that the transport block failed to be successfully decoded, wherein measuring the flow characteristic may be based at least in part on the determination.

A method of wireless communication is described. The method may include transmitting a transport block during a transmission period comprising more than one frame, identifying that a retransmission threshold is satisfied based at least in part on a time duration since a beginning of the transmission period associated with the transport block, and retransmitting the transport block based at least in part on the retransmission threshold being satisfied.

An apparatus for wireless communication is described. The apparatus may include means for transmitting a transport block during a transmission period comprising more than one frame, means for identifying that a retransmission threshold is satisfied based at least in part on a time duration since a beginning of the transmission period associated with the transport block, and means for retransmitting the transport block based at least in part on the retransmission threshold being satisfied.

Another apparatus for wireless communication is described. The apparatus may include a processor, memory in electronic communication with the processor, and instructions stored in the memory. The instructions may be operable to cause the processor to transmit a transport block during a transmission period comprising more than one frame, identify that a retransmission threshold is satisfied based at least in part on a time duration since a beginning of the transmission period associated with the transport block, and retransmit the transport block based at least in part on the retransmission threshold being satisfied.

A non-transitory computer readable medium for wireless communication is described. The non-transitory computer-readable medium may include instructions operable to cause a processor to transmit a transport block during a transmission period comprising more than one frame, identify that a retransmission threshold is satisfied based at least in part on a time duration since a beginning of the transmission period associated with the transport block, and retransmit the transport block based at least in part on the retransmission threshold being satisfied.

Some examples of the method, apparatus, and non-transitory computer-readable medium described above may further include processes, features, means, or instructions for identifying that a radio link control (RLC) layer may be operating in an unacknowledged mode.

In some examples of the method, apparatus, and non-transitory computer-readable medium described above, the retransmission threshold may be satisfied after an allowed number of retransmissions of the transport block associated with a logical channel may have failed.

Some examples of the method, apparatus, and non-transitory computer-readable medium described above may further include processes, features, means, or instructions for adjusting a modulation and coding scheme of the transport block based at least in part on the retransmission threshold being satisfied.

Some examples of the method, apparatus, and non-transitory computer-readable medium described above may further include processes, features, means, or instructions for retransmitting the transport block in consecutive transmission time intervals (TTIs) based at least in part on the retransmission threshold being satisfied.

In some examples of the method, apparatus, and non-transitory computer-readable medium described above, the determining and the retransmitting may be performed at a media access control (MAC) layer.

Some examples of the method, apparatus, and non-transitory computer-readable medium described above may further include processes, features, means, or instructions for determining that a resources threshold may be satisfied based at least in part on the retransmission threshold being satisfied and the RLC layer operating in an unacknowledged mode.

Some examples of the method, apparatus, and non-transitory computer-readable medium described above may further include processes, features, means, or instructions for comparing transmission time intervals (TTIs) remaining in the transmission period to the resources threshold, wherein determining the resources threshold may be satisfied may be based at least in part on the comparison.

Some examples of the method, apparatus, and non-transitory computer-readable medium described above may further include processes, features, means, or instructions for comparing a second time duration remaining in the transmission period to the retransmission threshold, wherein identifying that the retransmission threshold may be satisfied may be based at least in part on the comparison.

Some examples of the method, apparatus, and non-transitory computer-readable medium described above may further include processes, features, means, or instructions for transmitting a scheduling request that requests communication resources for retransmitting the transport block based at least in part on the retransmission threshold being satisfied.

In some examples of the method, apparatus, and non-transitory computer-readable medium described above, the scheduling request includes an indication that the scheduling request may be for a retransmission of the transport block.

Some examples of the method, apparatus, and non-transitory computer-readable medium described above may further include processes, features, means, or instructions for receiving a grant of communication resources that includes a reliability parameter associated with the transport block, wherein the reliability parameter indicates that the transport block should be modified prior to retransmission.

In some examples of the method, apparatus, and non-transitory computer-readable medium described above, the grant of communication resources includes a new modulation and coding scheme associated with the transport block.

In some examples of the method, apparatus, and non-transitory computer-readable medium described above, the grant of communication resources indicates that the transport block it to be transmitted in consecutive transmission time intervals (TTIs) based at least in part on the retransmission threshold being satisfied.

In some examples of the method, apparatus, and non-transitory computer-readable medium described above, a user equipment (UE) transmits the scheduling request to a base station.

Some examples of the method, apparatus, and non-transitory computer-readable medium described above may further include processes, features, means, or instructions for identifying a second retransmission threshold that may be greater than the retransmission threshold, wherein a number of unsuccessful retransmissions of the transport block satisfy the second retransmission threshold.

In some examples of the method, apparatus, and non-transitory computer-readable medium described above, the transport block may be sent as part of a hybrid automatic-repeat-request (HARQ) procedure.

Some examples of the method, apparatus, and non-transitory computer-readable medium described above may further include processes, features, means, or instructions for receiving, after identifying that the retransmission threshold may be satisfied, a message indicating that a last retransmission of the transport block was not received by a recipient.

Some examples of the method, apparatus, and non-transitory computer-readable medium described above may further include processes, features, means, or instructions for transmitting the transport block based at least in part on receiving a hybrid automatic-repeat-request (HARQ) negative acknowledgement (NACK) indicating that a previous transmission of the transport block was not received by a recipient.

A method of wireless communication is described. The method may include receiving a transport block during a transmission period comprising more than one frame, identifying that a retransmission threshold is satisfied based at least in part on a time duration since a beginning of the transmission period associated with the transport block, and transmitting a negative acknowledgement (NACK) indicating that a last retransmission of the transport block was not received based at least in part on the retransmission threshold being satisfied.

An apparatus for wireless communication is described. The apparatus may include means for receiving a transport block during a transmission period comprising more than one frame, means for identifying that a retransmission threshold is satisfied based at least in part on a time duration since a beginning of the transmission period associated with the transport block, and means for transmitting a negative acknowledgement (NACK) indicating that a last retransmission of the transport block was not received based at least in part on the retransmission threshold being satisfied.

Another apparatus for wireless communication is described. The apparatus may include a processor, memory in electronic communication with the processor, and instructions stored in the memory. The instructions may be operable to cause the processor to receive a transport block during a transmission period comprising more than one frame, identify that a retransmission threshold is satisfied based at least in part on a time duration since a beginning of the transmission period associated with the transport block, and transmit a negative acknowledgement (NACK) indicating that a last retransmission of the transport block was not received based at least in part on the retransmission threshold being satisfied.

A non-transitory computer readable medium for wireless communication is described. The non-transitory computer-readable medium may include instructions operable to cause a processor to receive a transport block during a transmission period comprising more than one frame, identify that a retransmission threshold is satisfied based at least in part on a time duration since a beginning of the transmission period associated with the transport block, and transmit a negative acknowledgement (NACK) indicating that a last retransmission of the transport block was not received based at least in part on the retransmission threshold being satisfied.

Some examples of the method, apparatus, and non-transitory computer-readable medium described above may further include processes, features, means, or instructions for receiving a retransmission of the transport block after satisfying the retransmission threshold.

In some examples of the method, apparatus, and non-transitory computer-readable medium described above, the retransmission threshold may be satisfied after an allowed number of retransmissions of the transport block associated with a logical channel may have failed.

In some examples of the method, apparatus, and non-transitory computer-readable medium described above, the determining and the transmitting may be performed by a media access control (MAC) layer.

Some examples of the method, apparatus, and non-transitory computer-readable medium described above may further include processes, features, means, or instructions for determining that a resources threshold may be satisfied based at least in part on the retransmission threshold being satisfied.

Some examples of the method, apparatus, and non-transitory computer-readable medium described above may further include processes, features, means, or instructions for comparing transmission time intervals (TTIs) remaining in the transmission period to the resources threshold, wherein determining the resources threshold may be satisfied may be based at least in part on the comparison.

Some examples of the method, apparatus, and non-transitory computer-readable medium described above may further include processes, features, means, or instructions for comparing a second time duration remaining in the transmission period to the retransmission threshold, wherein identifying that the retransmission threshold may be satisfied may be based at least in part on the comparison.

Some examples of the method, apparatus, and non-transitory computer-readable medium described above may further include processes, features, means, or instructions for receiving a scheduling request that requests communication resources for retransmitting the transport block.

In some examples of the method, apparatus, and non-transitory computer-readable medium described above, the scheduling request includes an indication that the scheduling request may be for a retransmission of the transport block.

In some examples of the method, apparatus, and non-transitory computer-readable medium described above, the NACK may be associated with a grant of communication resources generated after determining that the retransmission threshold may be satisfied.

In some examples of the method, apparatus, and non-transitory computer-readable medium described above, the grant of communication resources includes a new modulation and coding scheme associated with the transport block.

In some examples of the method, apparatus, and non-transitory computer-readable medium described above, the grant of communication resources indicates that the transport block be transmitted in consecutive transmission time intervals (TTIs) based at least in part on satisfying the retransmission threshold.

Some examples of the method, apparatus, and non-transitory computer-readable medium described above may further include processes, features, means, or instructions for transmitting a hybrid automatic-repeat-request (HARQ) NACK based at least in part on being unable to decode the transport block transmitted by a remote source.

A method of wireless communication is described. The method may include identifying that a retransmission threshold is satisfied after an allowed number of retransmissions of a transport block associated with a logical channel have failed, identifying that a radio link control (RLC) layer associated with at least a portion of the unsuccessful retransmissions is operating in an unacknowledged mode, and retransmitting the transport block based at least in part on the retransmission threshold being satisfied.

An apparatus for wireless communication is described. The apparatus may include means for identifying that a retransmission threshold is satisfied after an allowed number of retransmissions of a transport block associated with a logical channel have failed, means for identifying that a radio link control (RLC) layer associated with at least a portion of the unsuccessful retransmissions is operating in an unacknowledged mode, and means for retransmitting the transport block based at least in part on the retransmission threshold being satisfied.

Another apparatus for wireless communication is described. The apparatus may include a processor, memory in electronic communication with the processor, and instructions stored in the memory. The instructions may be operable to cause the processor to identify that a retransmission threshold is satisfied after an allowed number of retransmissions of a transport block associated with a logical channel have failed, identify that a radio link control (RLC) layer associated with at least a portion of the unsuccessful retransmissions is operating in an unacknowledged mode, and retransmit the transport block based at least in part on the retransmission threshold being satisfied.

A non-transitory computer readable medium for wireless communication is described. The non-transitory computer-readable medium may include instructions operable to cause a processor to identify that a retransmission threshold is satisfied after an allowed number of retransmissions of a transport block associated with a logical channel have failed, identify that a radio link control (RLC) layer associated with at least a portion of the unsuccessful retransmissions is operating in an unacknowledged mode, and retransmit the transport block based at least in part on the retransmission threshold being satisfied.

Some examples of the method, apparatus, and non-transitory computer-readable medium described above may further include processes, features, means, or instructions for adjusting a modulation and coding scheme of the transport block based at least in part on the retransmission threshold being satisfied.

Some examples of the method, apparatus, and non-transitory computer-readable medium described above may further include processes, features, means, or instructions for retransmitting the transport block in consecutive transmission time intervals (TTIs) based at least in part on the retransmission threshold being satisfied.

In some examples of the method, apparatus, and non-transitory computer-readable medium described above, the retransmitting may be performed at a media access control (MAC) layer associated with the unsuccessful retransmissions.

Some examples of the method, apparatus, and non-transitory computer-readable medium described above may further include processes, features, means, or instructions for determining that a resources threshold may be satisfied based at least in part on the retransmission threshold being satisfied and the RLC layer operating in the unacknowledged mode.

Some examples of the method, apparatus, and non-transitory computer-readable medium described above may further include processes, features, means, or instructions for comparing transmission time intervals (TTIs) remaining in a transmission period to the resources threshold, wherein determining the resources threshold may be satisfied may be based at least in part on the comparison.

Some examples of the method, apparatus, and non-transitory computer-readable medium described above may further include processes, features, means, or instructions for transmitting a scheduling request that requests communication resources for retransmitting the transport block based at least in part on the retransmission threshold being satisfied.

In some examples of the method, apparatus, and non-transitory computer-readable medium described above, the scheduling request includes an indication that the scheduling request may be for a retransmission of the transport block.

Some examples of the method, apparatus, and non-transitory computer-readable medium described above may further include processes, features, means, or instructions for receiving a grant of communication resources that includes a reliability parameter associated with the transport block, wherein the reliability parameter indicates that the transport block should be modified prior to retransmission.

In some examples of the method, apparatus, and non-transitory computer-readable medium described above, the grant of communication resources includes a new modulation and coding scheme associated with the transport block.

In some examples of the method, apparatus, and non-transitory computer-readable medium described above, the grant of communication resources indicates that the transport block it to be transmitted in consecutive transmission time intervals (TTIs) based at least in part on the retransmission threshold being satisfied.

In some examples of the method, apparatus, and non-transitory computer-readable medium described above, a user equipment (UE) transmits the scheduling request to a base station.

Some examples of the method, apparatus, and non-transitory computer-readable medium described above may further include processes, features, means, or instructions for identifying a second retransmission threshold that may be greater than the retransmission threshold, wherein the transport block is retransmitted until a second number of unsuccessful retransmissions of the transport block satisfy the second retransmission threshold.

Some examples of the method, apparatus, and non-transitory computer-readable medium described above may further include processes, features, means, or instructions for receiving, after identifying that the retransmission threshold may be satisfied, a message indicating that a last retransmission of the transport block was not received by a recipient.

Some examples of the method, apparatus, and non-transitory computer-readable medium described above may further include processes, features, means, or instructions for transmitting the transport block based at least in part on receiving a hybrid automatic-repeat-request (HARQ) negative acknowledgement (NACK) indicating that a previous transmission of the transport block was not received by a recipient.

In some examples of the method, apparatus, and non-transitory computer-readable medium described above, the unsuccessful retransmissions of the transport block may be sent as part of a hybrid automatic-repeat-request (HARQ) procedure.

A method of wireless communication is described. The method may include identifying that a retransmission threshold is satisfied after an allowed number of retransmissions of a transport block associated with a logical channel have failed and transmitting a negative acknowledgement (NACK) indicating that a last retransmission of the transport block was not received based at least in part on the retransmission threshold being satisfied.

An apparatus for wireless communication is described. The apparatus may include means for identifying that a retransmission threshold is satisfied after an allowed number of retransmissions of a transport block associated with a logical channel have failed and means for transmitting a negative acknowledgement (NACK) indicating that a last retransmission of the transport block was not received based at least in part on the retransmission threshold being satisfied.

Another apparatus for wireless communication is described. The apparatus may include a processor, memory in electronic communication with the processor, and instructions stored in the memory. The instructions may be operable to cause the processor to identify that a retransmission threshold is satisfied after an allowed number of retransmissions of a transport block associated with a logical channel have failed and transmit a negative acknowledgement (NACK) indicating that a last retransmission of the transport block was not received based at least in part on the retransmission threshold being satisfied.

A non-transitory computer readable medium for wireless communication is described. The non-transitory computer-readable medium may include instructions operable to cause a processor to identify that a retransmission threshold is satisfied after an allowed number of retransmissions of a transport block associated with a logical channel have failed and transmit a negative acknowledgement (NACK) indicating that a last retransmission of the transport block was not received based at least in part on the retransmission threshold being satisfied.

Some examples of the method, apparatus, and non-transitory computer-readable medium described above may further include processes, features, means, or instructions for receiving a retransmission of the transport block after satisfying the retransmission threshold and the retransmission threshold.

In some examples of the method, apparatus, and non-transitory computer-readable medium described above, the transmitting may be performed by a media access control (MAC) layer.

Some examples of the method, apparatus, and non-transitory computer-readable medium described above may further include processes, features, means, or instructions for determining that a resources threshold may be satisfied based at least in part on the retransmission threshold being satisfied.

Some examples of the method, apparatus, and non-transitory computer-readable medium described above may further include processes, features, means, or instructions for comparing transmission time intervals (TTIs) remaining in a transmission period to the resources threshold, wherein determining the resources threshold may be satisfied may be based at least in part on the comparison.

Some examples of the method, apparatus, and non-transitory computer-readable medium described above may further include processes, features, means, or instructions for receiving a scheduling request that requests communication resources for retransmitting the transport block.

In some examples of the method, apparatus, and non-transitory computer-readable medium described above, the scheduling request includes an indication that the scheduling request may be for a retransmission of the transport block.

In some examples of the method, apparatus, and non-transitory computer-readable medium described above, the NACK may be associated with a grant of communication resources generated after determining that the retransmission threshold may be satisfied.

In some examples of the method, apparatus, and non-transitory computer-readable medium described above, the grant of communication resources includes a new modulation and coding scheme associated with the transport block.

In some examples of the method, apparatus, and non-transitory computer-readable medium described above, the grant of communication resources indicates that the transport block be transmitted in consecutive transmission time intervals (TTIs) based at least in part on satisfying the retransmission threshold.

Some examples of the method, apparatus, and non-transitory computer-readable medium described above may further include processes, features, means, or instructions for transmitting a hybrid automatic-repeat-request (HARD)

NACK based at least in part on being unable to decode the transport block transmitted by a remote source.

DETAILED DESCRIPTION

Figure 1:
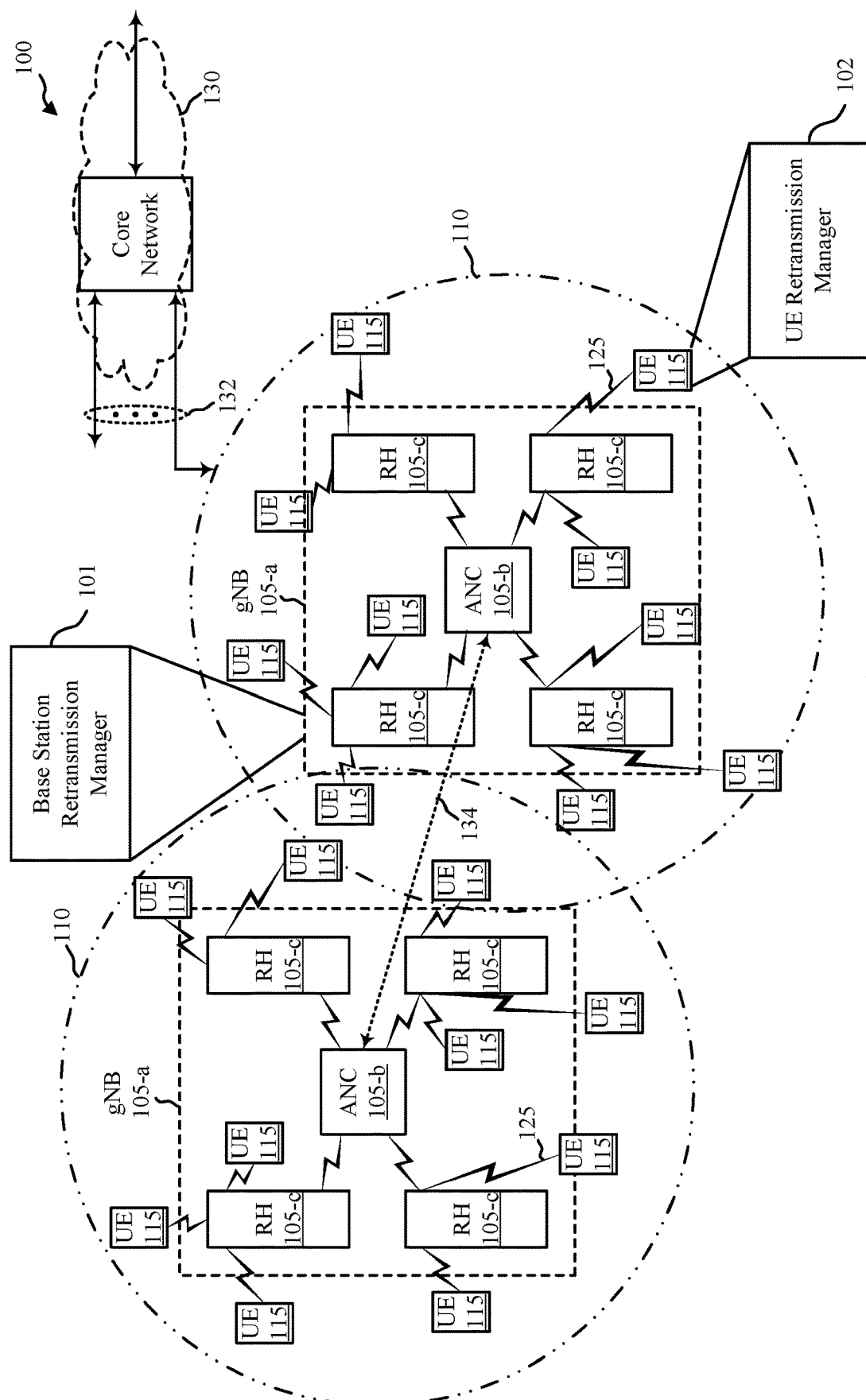
FIG. 1 illustrates an example of a system for wireless communication that supports techniques to improve data transfer reliability in accordance with one or more aspects of the present disclosure.

Wireless communication systems employ error correction procedures such as HARQ and ARQ to correct errors in transmitted data. The way these error correction procedures are implemented may be limited by the amount of communication resources available to perform such error correction procedures. In some low-latency applications (e.g., Voice over Long-Term Evolution (VoLTE)), the amount of available resources may be altered due to changing a duration of transmission time intervals (TTIs) or to shortening turn-around times in a HARQ procedure.

Techniques are described herein to dynamically control a number of HARQ transmissions based at least in part on flow characteristics of a data flow. Data included in a transport block may be grouped into one or more data flows based on a variety of factors. A set of performance benchmarks may be associated with each data flow. Flow characteristics for each data flow may be measured. A network entity may determine a number of HARQ transmissions to be transmitted during a HARQ procedure based on measured flow characteristics satisfying the performance benchmarks. For example, if a performance benchmark is not satisfied by its associated flow characteristic, the network entity may request additional HARQ transmissions during the HARQ procedure. A network entity may be configured to adaptively select a number of HARQ transmissions for each individual transport block based on these criteria.

In some examples, techniques are described herein to perform additional HARQ procedures beyond what is typically performed. A network entity may determine whether a maximum number of HARQ retransmissions has been reached. The network entity may also determine whether to initiate additional HARQ procedures based at least in part on reaching the maximum number of HARQ retransmissions. The determination whether to initiate additional HARQ procedures may be based on communication resources available in a transmission period, control information associated with a bearer or logical channel, which mode of operation a RLC layer is operating in (e.g., unacknowledged mode), or various combinations thereof. In some examples, the network entity may adjust characteristics of the transmissions in the additional HARQ procedures based at least in part on the reaching the maximum number of HARQ retransmissions.

Advantages of these techniques may include improving the reliability of data being communicated in a wireless network. Other advantages may include, using more efficiently available resources to perform error correction without unduly burdening low-latency requirements of some applications. For example, in voice data transmitted via packet switching (e.g., VoLTE), to maintain low-latency, ARQ procedure at the RLC layer may not be performed. However, additional HARQ procedures may be used to reduce the number of lost packets in VoLTE without violating low-latency requirements.

Aspects of the disclosure are initially described in the context of a wireless communications system. Aspects of the disclosure are illustrated and described with reference to wireless communication systems, timelines, and communication schemes. Aspects of the disclosure are further illustrated by and described with reference to apparatus diagrams, system diagrams, and flowcharts that relate to techniques to improve data transfer reliability. In some examples, the techniques may be executed when a device is in an unacknowledged mode.

FIG. 1 illustrates an example of a wireless communication system 100 in accordance with one or more aspects of the present disclosure. The wireless communication system 100 may include network access devices 105 (e.g., gNodeBs (gNBs), and/or radio heads (RHs)), UEs 115, and a core network 130. In some examples, the wireless communication system 100 may be a LTE (or LTE-Advanced) network, or an NR network. In some cases, wireless communication system 100 may support enhanced broadband communications, ultra-reliable (i.e., mission critical) communications, low latency communications, and communications with low-cost and low-complexity devices. Techniques are described herein to initiate additional HARQ procedures even after a retransmission threshold associated with HARQ has been satisfied. In some examples, additional HARQ procedures may be initiated when the RLC layer of the transmitting entity is operating in an unacknowledged mode or a transparent mode. When the transmitting entity is operating in the unacknowledged mode, the transmitting entity does not require a response (e.g., an acknowledgement (ACK) or a negative ACK (NACK)) from a receiving entity.

The core network 130 may provide user authentication, access authorization, tracking, Internet Protocol (IP) connectivity, and other access, routing, or mobility functions. At least some of the network access devices 105 (e.g., eNodeBs (eNBs, network access devices, gNBs) 105-a, gNBs, or access node controllers (ANCs) may interface with the core network 130 through backhaul links 132 (e.g., S1, S2, etc.) may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-b may additionally or alternatively communicate with a number of UEs 115 through a number of smart radio heads (radio heads) 105-c. In an alternative configuration of the wireless communication system 100, the functionality of an ANC 105-b may be provided by a radio head 105-c or distributed across the radio heads 105-c of an eNB 105-a. In another alternative configuration of the wireless communication system 100, the radio heads 105-c may be replaced with base stations, and the ANCs 105—may be replaced by base station controllers (or links to the core network 130).

The ANCs 105-b may wirelessly communicate with the UEs 115 via one or more radio heads 105-c, with each radio head 105-c having one or more antennas. Each of the radio heads 105-c may provide communication coverage for a respective geographic coverage area 110. The geographic coverage area 110 for a radio head 105-c may be divided into sectors making up only a portion of the coverage area (not shown). In some examples, the network access devices 105 may be replaced with alternative network access devices, such as base transceiver stations, radio base stations, access points, radio transceivers, NodeBs, eNBs, Home NodeBs, Home eNBs, etc. The wireless communication system 100 may include radio heads 105-c (or base stations or other network access devices) of different types (e.g., macro cell and/or small cell network access devices). The geographic coverage areas 110 of the radio heads 105-c or other network access devices may overlap. In some examples, different eNBs 105-a may be associated with different radio access technologies.

In some examples, the wireless communication system 100 may include a 5G network. In other examples, the wireless communication system 100 may include a LTE/LTE-A network. The wireless communication system 100 may in some cases be a heterogeneous network, in which different types of eNBs provide coverage for various geographical regions. For example, each eNB 105-a or radio head 105-c may provide communication coverage for a macro cell, a small cell, and/or other types of cell. The term "cell" is a 3GPP term that can be used to describe a base station, a radio head, a carrier or component carrier associated with a base station or a radio head, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell may additionally or alternatively cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the eNBs 105-a and/or radio heads 105-c may have similar frame timing, and transmissions from different eNBs 105-a and/or radio heads 105-c may be approximately aligned in time. For asynchronous operation, the eNBs 105-a and/or radio heads 105-c may have different frame timings, and transmissions from different eNBs 105-a and/or radio heads 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A RLC layer may in some cases perform packet segmentation and reassembly to communicate over logical channels. A MAC layer may perform priority handling and multiplexing of logical channels into transport channels. The MAC layer may additionally or alternatively use HARQ to provide retransmission at the MAC layer to improve link efficiency. In the control plane, the Radio Resource Control (RRC) protocol layer may provide establishment, configuration, and maintenance of an RRC connection between a UE 115 and a radio head 105-c, ANC 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may additionally or alternatively include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of eNBs 105-a, radio heads 105-c, base stations, access points, or other network access devices, including macro eNBs, small cell eNBs, relay base stations, and the like. A UE may additionally or alternatively be able to communicate directly with other UEs (e.g., using a peer-to-peer (P2P) protocol).

The communication links 125 shown in wireless communication system 100 may include uplink (UL) channels from a UE 115 to a radio head 105-c, and/or downlink (DL) channels, from a radio head 105-c to a UE 115. The downlink channels may additionally or alternatively be called forward link channels, while the uplink channels may additionally or alternatively be called reverse link channels.

One or more of eNBs 105-*a* may include a base station retransmission manager 101, which may be configured to initiate additional HARQ procedures when certain conditions are met. HARQ procedures may be terminated after a certain number of HARQ retransmissions are sent. Additional HARQ procedures may be performed when, for example, the base station 105 is operating in an unacknowledged mode.

UEs 115 may include a UE retransmission manager 102, which may be configured to initiate additional HARQ procedures when certain conditions are met. For example, additional HARQ procedures may be performed when the UE 115 is operating in an unacknowledged mode. Base station retransmission manager 101 may be an example of base station retransmission manager 1515 described with reference to FIG. 15. UE retransmission manager 102 may be an example of UE retransmission manager 815 described with reference to FIG. 8.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, the radio heads 105-*c* and/or UEs 115 may include multiple antennas for employing antenna diversity schemes to improve communication quality and reliability between radio heads 105-*c* and UEs 115. Additionally or alternatively, radio heads 105-*c* and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may additionally or alternatively be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communication system 100 may operate in an ultra high frequency (UHF) frequency region using frequency bands from 700 MHz to 2600 MHz (2.6 GHz), although in some cases wireless local area networks (WLAN) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and network access devices 105. Devices operating in mmW or EHF bands may have multiple antennas to allow beamforming. That is, a network access devices 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a network access device 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

MIMO wireless systems use a transmission scheme between a transmitter (e.g., a network access device) and a receiver (e.g. a UE), where both transmitter and receiver are equipped with multiple antennas. Some portions of wireless communication system 100 may use beamforming. For example, network access device 105 may have an antenna array with a number of rows and columns of antenna ports that the network access device 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a network access device 105 or UE 115 may be located within one or more antenna arrays, which may support beamforming or MIMO operation. One or more network access device antennas or antenna arrays may be collocated at an antenna assembly, such as an antenna tower. In some cases, antennas or antenna arrays associated with a network access device 105 may be located in diverse geographic locations. A network access device 105 may use multiple antennas or antenna arrays to conduct beamforming operations for directional communications with a UE 115.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or network access device 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communication system 100 may utilize both licensed and unlicensed radio frequency spectrum bands. For example, wireless communication system 100 may employ LTE License Assisted Access (LTE-LAA) or LTE Unlicensed radio access technology or NR technology in an unlicensed band such as the 5 Ghz Industrial, Scientific, and Medical (ISM) band. When operating in unlicensed radio frequency spectrum bands, wireless devices such as network access devices 105 and UEs 115 may employ listen-before-talk (LBT) procedures to ensure the channel is clear before transmitting data. In some cases, operations in unlicensed bands may be based on a CA configuration in conjunction with component carriers (CCs) operating in a licensed band. Operations in unlicensed spectrum may include downlink transmissions, uplink transmissions, or both. Duplexing in unlicensed spectrum may be based on FDD, TDD or a combination of both.

Figure 2:
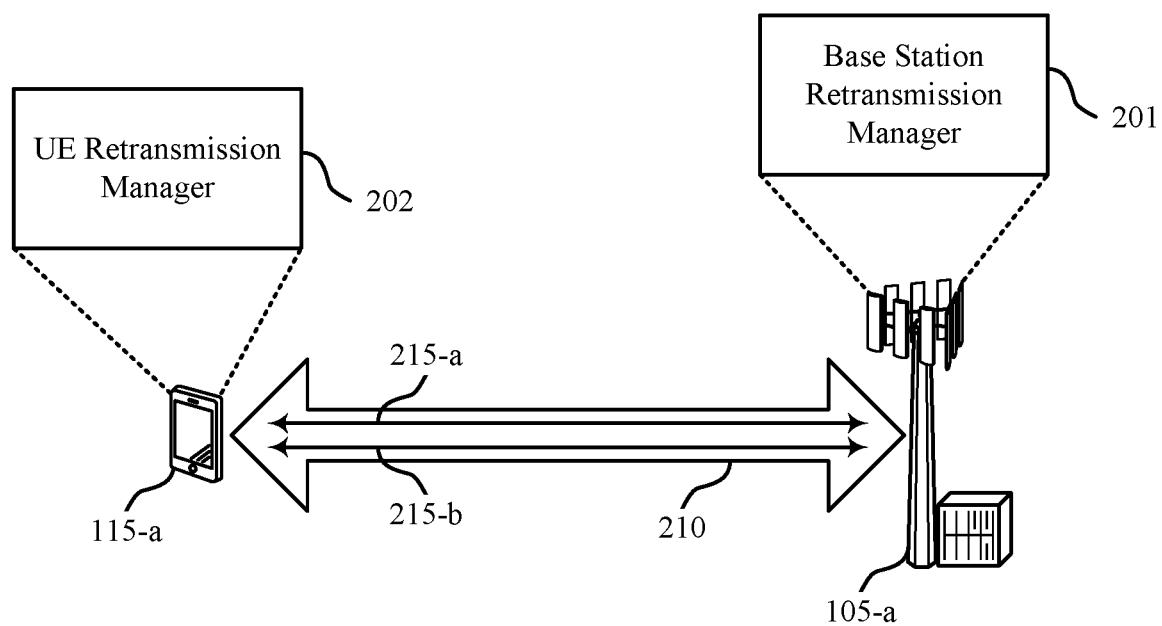
FIG. 2 illustrates an example of a wireless communication system that supports techniques to improve data transfer reliability in accordance with one or more aspects of the present disclosure.

FIG. 2 illustrates an example of a wireless communication system 200 for techniques to improve data transfer reliability in accordance with one or more aspects of the present disclosure. The wireless communication system 200 includes a base station 105-a and a UE 115-a. During the normal course of operations, the base station 105-a and the UE 115-a may communicate data 210 back and forth via a communication link. Sometimes the data 210 may not be successfully received by its recipient (e.g., either the base station 105-a or the UE 115-a depending on which entity is transmitting). Consequently, the wireless communication system 200 may include procedures to improve the quality of the data 210 being communicated or to correct for errors that may occur in the data 210. For example, at the MAC layer, one of the network entities (e.g., base station 105-a or UE 115-a) may perform HARQ procedures in the event of a failed data transmission. In another example, at the RLC layer, one of the network entities (e.g., base station 105-a or UE 115-a) may perform an ARQ procedure in the event of a failed data transmission. In some examples, both HARQ and ARQ procedures may be employed to ensure that data 210 is reliably received. The base station 105-b may include a base station retransmission manager 201 and the UE 115-a may include a UE retransmission manager 202. These managers 201, 202 may be examples of the managers 101, 102 described with reference to FIG. 1.

Data 210 transmitted between the base station 105-a and the UE 115-a may grouped into one or more flows 215 based on a variety of attributes of the data 210. Attributes used to group the data 210 into flows 215 may include an IP source address, an IP destination address, a source port, a destination port, a protocol type, a type of data, a class of service, a router or switch interface or combinations thereof. Flow characteristics may be determined for each flow 215. Flow characteristics may include packet error rate of the flow 215, time-delay of data transmissions of the flow 215, effective jitter of data transmissions of the flow 215, or throughput of the flow 215, or combinations thereof. Each flow 215 may have a different set of performance benchmarks based on the flow characteristics associated with the flow 215. These performance benchmarks may be associated with measurable flow characteristics of the flow 215.

In some cases, data 210 may be grouped into flow 215 based on the type of data being transmitted. For example, voice data may be grouped into a first flow 215-a and Internet traffic may be grouped into a second flow 215-b. A performance benchmark of packet error rate for the voice data flow 215-a may be different from a performance benchmark of packet error rate for the Internet data flow 215-b. For instances, the voice data flow 215-a may tolerate more packet loss than the internet data flow 215-b. Types of flows may include voice data flows, internet data flows, gaming flows, instant messaging flows, video streaming flows, virtual reality flows, multimedia downloading flows, other types of groupings, or combinations thereof.

In some examples, the wireless communication system 200 may be configured to control the number of HARQ retransmissions for a given transmission based on a measured flow characteristic of a flow 215 satisfying a performance benchmark (e.g., satisfying a threshold). A network entity, such as base station 105-a, may be configured to dynamically set a number of HARQ retransmissions or a maximum number of HARQ retransmissions based on the measured flow characteristics of the flow 215 associated with the transmission and the performance benchmarks for that flow 215.

In some examples, the RLC can operate in variety of different modes including in RLC transparent mode, RLC unacknowledged mode, or RLC acknowledged mode. In acknowledged mode, the RLC layer may perform error correction through ARQ procedures and perform other protocol error detection and recover procedures. In some examples, the ARQ procedures of error detection and recovery are performed only in the acknowledged mode. The RLC layer may handle retransmissions for any missing RLC protocol data units (PDUs) when in acknowledged mode. In an RLC ARQ procedure, a transmitting entity (e.g., base station 105-a or UE 115-a) may initiate a polling procedure based on various conditions such as, for example, the number of bytes received satisfying a threshold, the number of PDUs received satisfying a threshold, other factors, or combinations thereof. The transmitting entity may set a poll bit in the RLC header of a packet being transmitted to the receiving entity. Upon receiving the set poll bit, the receiving entity generates and provides status information to the transmitting entity. For example, the receiving entity may transmit an ACK or a NACK that certain RLC data has been or not been received. If the transmitting entity receives a NACK for certain data, the transmitting entity may retransmit that data. In some examples, the RLC ARQ procedures are used in conjunction with HARQ procedures. In some examples, RLC ARQ procedures are initiated after the HARQ retransmissions fail to decode a transport block. In acknowledged mode, if a HARQ retransmissions fails to decode a transport block correctly, then all RLC PDUs within the transport block will have to be retransmitted at the RLC layer.

In an unacknowledged mode, the RLC layer may not perform any ARQ procedures. As such, additional errors in the data 210 may occur, when compared to acknowledged mode. Unacknowledged mode may be characterized by less reliable data transfer than acknowledged mode. In unacknowledged mode, the transmitting entity does not initiate polling procedures and the receiving entity does not transmit any ACKs or NACKs. In some examples, in unacknowledged mode, if the HARQ fails to decode a transport block after all retransmissions, the RLC PDUs within the transport block, are lost. Unacknowledged mode may be used in applications with strict latency requirements, but where some data loss is acceptable. For example, unacknowledged mode may be used in VoLTE applications or other applications with real time traffic that has strict latency requirements, but can handle a few losses. Under such circumstances, the additional delays in packet arrival caused by ARQ procedures at the RLC layer may be more harmful to performance than the loss of some packets, due to the strict latency requirements.

Additional HARQ procedures, performed at the MAC layer, may be executed when the RLC layer is operating in unacknowledged mode to provide additional error correction. For example, timelines in 5G NR, LTE Ultra low latency (ULL) may have shrunk. As such, the reduced timelines may provide additional time to use HARQ procedures to recover the packets for Voice over New Radio (VoNR) or other low-latency applications. The reduced timelines may provide additional resources to perform additional retransmissions of a transport block in response to a HARQ NACK.

The base station 105-a may be an example of the base stations 105 described with reference to FIG. 1. The UE 115-a may be an example of the UEs 115 described with reference to FIG. 1.

Figure 3:
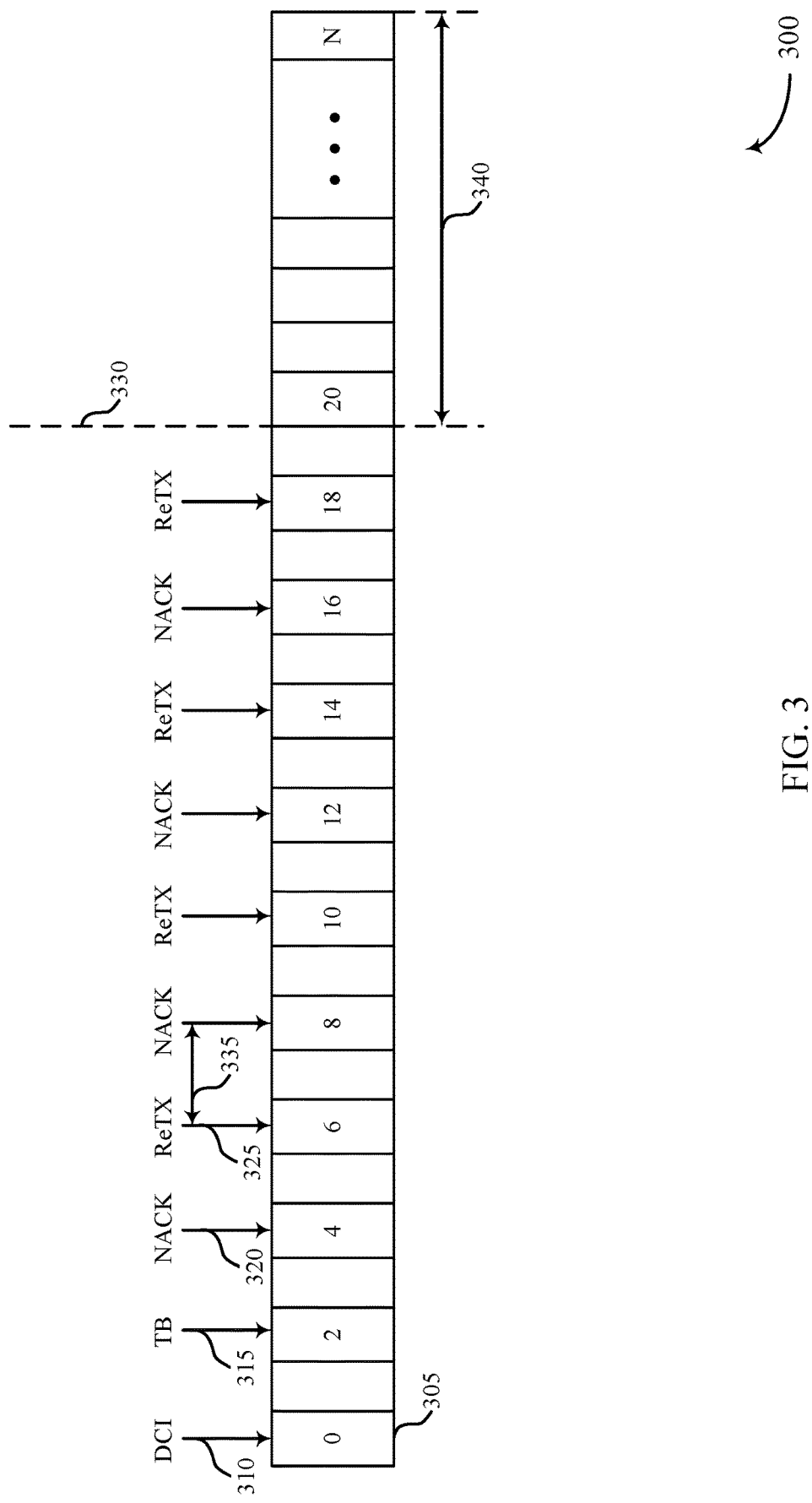
FIG. 3 illustrates an example of a timeline that supports techniques to improve data transfer reliability in accordance with one or more aspects of the present disclosure.

FIG. 3 illustrates an example of a timeline 300 for techniques to improve data transfer reliability in accordance with one or more aspects of the present disclosure. The timeline 300 may be an example of a transmission period used to communicate data in a wireless communication system such as, for example, the systems 100 or 200. In some examples, the timeline 300 may be associated with a bearer. In some examples, the timeline 300 may be associated with a logical channel.

The timeline 300 may include TTIs 305. The timeline 300 may have a length equal to 40 milliseconds. For example, in some low-latency applications such as audio or VoLTE, one packet may be generated every 20 milliseconds. The discontinuous reception (DRX) configuration may indicate that in these low-latency applications the DRX cycle may be 40 milliseconds. As such, a packet may be transmitted from the transmitting entity (e.g., UE 115-a or base station 105-a) every 40 milliseconds. Two of these packets (e.g., audio packets) may be bundled into a single RLC PDU.

Each TTI 305 may have a given time length. In some examples, a TTI 305 length may be equal to one millisecond. In other examples, a TTI length may be equal to 500 microseconds or 250 microseconds. Consequently, in these examples, the timeline 300 may comprise between 40 TTIs and 160 TTIs, depending on the length of the TTIs in the packet.

In some communication systems (e.g., LTE), the HARQ timeline for FDD is eight TTIs 305 between each transmission or retransmission of a transport block. In these communication systems, four TTIs 305 may separate a transmission of a transport block and a HARQ ACK or NACK.

In other communication systems, the HARQ timeline may be reduced. For example, in some communication systems, the HARQ timeline for FDD is four TTIs 305 between each transmission or retransmission of a transport block. Timeline 300 shows an example of HARQ procedures when a UE 115-a is the transmitting entity and a base station 105 is a receiving entity. In other examples, however, the base station 105 may be a transmitting entity and a UE 115-a may be a receiving entity in the HARQ procedure.

The base station 105-a may transmit downlink control information (DCI) 310 for a transport block 315 at TTI 0. At TTI 2, the UE 115-a may transmit the transport block 315 based on the DCI 310. The transport block 315 may be transmitted via physical uplink shared channel (PUSCH) because the UE 115-a in this example is the transmitting entity. Upon receiving the transport block 315, the base station 105-a may determine whether the transport block 315 was received successful. If not, the base station 105-a may transmit a HARQ NACK 320 to the UE 115-a. At TTI 4, the UE 115-a may retransmit the transport block 315 via a HARQ retransmission (ReTX) 325 based on receiving the HARQ NACK 320.

In a HARQ procedure, the process of sending and receiving the HARQ NACKs 320 and HARQ retransmissions 325 may repeat for many as many iterations as the transmission of the transport block 315 continue to fail. In some examples, the HARQ procedure includes a retransmission threshold 330 indicative of a maximum number of HARQ retransmissions 325 that may be performed before the HARQ procedure is abandoned and the HARQ buffers flushed. In some examples, the retransmission threshold 330 may be equal to five transmissions of the transport block 315

(or, expressed another way, four HARQ retransmissions 325 of the transport block 315). In some examples, one of the network entities (either the transmitting entity or the receiving entity) may maintain a HARQ counter during the HARQ procedure. The HARQ counter may be incremented every time the transport block 315 is transmitted or every time the transport block 315 is retransmitted as a HARQ retransmission 325.

A number 335 of TTIs between transmissions in the HARQ procedure may be two TTIs. In some examples, the number 335 of TTIs may be dynamically determined between each pair of transmission. In some examples, the number 335 of TTIs between transmissions may be four TTIs. In some examples, the number 335 of TTIs between transmission may be some other number of TTIs. In some examples, the number 335 may be measured in intervals of time rather than in TTIs. For example, the transmission in the HARQ procedure may be separated by on millisecond. In such examples, the transmission may be slotted into a TTI associated with the time interval.

In some examples, a maximum of four HARQ retransmissions (after the initial transmission) are possible in a transmission period before the next low-latency (e.g., VoLTE) packet arrives. In existing communication systems, the 40 millisecond periodicity, and eight millisecond turn-around time is the best performance that can be achieved. Once the 40 millisecond transmission period has expired, the system may not allow any more retransmissions. In unacknowledged mode, the RLC may be configured for a VoLTE bearer.

In other communication systems, however, where the length of the TTIs is reduce or where the turn-around time between transmissions is reduced, it may be possible to transmit more than four HARQ retransmissions within a transmission period. Once the retransmission threshold 330 is satisfied, there may exist additional remaining resources 340 in the transmission period. These remaining resources 340 may be associated with a bearer. These remaining resources 340 may be expressed as TTIs 305 remaining in the transmission period to retransmit the transport block 315. Techniques are described herein to utilize these remaining resources 340 for additional HARQ retransmissions 325 in the event that the previous HARQ retransmissions have failed.

In some communication systems (e.g., new radio), HARQ retransmissions may continue after a maximum allowed number of unsuccessful retransmissions has been reached. In some examples, the allowed number of unsuccessful retransmissions may be preconfigured. In some examples, the retransmissions are possible because of reduced timelines between transmissions. In some examples, the TTI durations are less (e.g., 250 microseconds or 500 microseconds) and the HARQ turn-around time is faster (e.g., two TTIs for two HARQ process structures with self-contained TTI). In such examples, this leaves more time to recover the transport block 315 using HARQ procedures within a low-latency (e.g., VoLTE or VoNR) periodicity. In some examples, the low-latency periodicity may be 40 milliseconds. In some examples, the system may be configured to determine the channel conditions for the HARQ retransmissions. In some examples, the channel conditions may be based on the number of unsuccessful HARQ retransmissions. In some examples, adaptive retransmissions with a lower modulation and coding scheme may be used to help to recover lost data (e.g., data in transport blocks). In some examples, repetition (i.e., TTI bundling) may also be used to help to recover lost data. In some communication systems, adaptive retransmissions could be configured using radio resource control (RRC). In some examples, upon determining that the channel conditions satisfy a threshold, the system may be configured to adapt HARQ retransmissions with lower modulation and coding scheme and/or TTI bundling. In some examples, upon determining that the HARQ retransmission has failed, and the transmitter is continuing further to recover the packets, the network may use these two options together.

HARQ procedures may be include different signaling mechanisms for uplink and downlink applications. In some examples, the signaling may change based on determining whether it is uplink or downlink. For uplink, after the retransmission threshold has been satisfied, the transmitting entity (e.g., UE 115-a) may send a scheduling request seeking additional communication resources to transmit additional HARQ retransmissions. In response to the scheduling request, the receiving entity (e.g., base station 105-a) may then a grant communication resources. In some examples, the grant may include transmission parameters that alter the HARQ retransmissions to be more reliable. In some examples, the base station 105-a may determine one or more transmission parameters prior to sending the grant to the UE 115-a. In some examples, the transmission parameters may include an adaptive modulation and coding scheme and add TTI bundling. In some examples, the base station may send a grant to the UE 115-a with higher reliability (i.e., a lower modulation and coding scheme).

In other examples, the UE 115-a may send a special scheduling request to the base station 105-a. The special scheduling request may include information that identifies that the grant is sought for a failed HARQ procedure. In some examples, the UE 115-a may receive a new HARQ grant from the base station in response to the scheduling request. The UE 115-a may use the new HARQ grant to continue retransmitting the failed transport block. In some examples, additional uplink signaling may indicate the same to the base station 105-a. In some examples, the additional uplink signaling may include a MAC control element configured to indicate the same to the base station 105-a. In some examples, the UE 115-a may indicate that it is sending a retransmission while sending information using the new HARQ grant.

In some examples, if a voice bearer is activated and voice traffic is present in the network, the base station 105-a may use such information to determine the adaptive retransmission grant. In some examples, the base station 105-a may use that information to determine one or more retransmission parameters (e.g., adaptive modulation and coding scheme or TTI bundling). In some examples, the scheduling request may be a single bit to ask for retransmission. In other examples, the scheduling request may be multiple bits in a message to ask for retransmission. In some examples, the base station 105-a may schedule a grant for retransmission. In some examples, the grant scheduled by the base station 105-a may be an adaptive retransmission grant. In some examples, the UE 115-a may wake up after a configured number of unsuccessful HARQ retransmissions to listen for the grant of additional resources. In some examples, the UE 115-a may wake up if all HARQ retransmissions have failed.

In some examples, the base station 105-a may allow for configuring a higher number of maximum allowed HARQ retransmissions for an unacknowledged mode bearer. In some examples, the UE 115-a must learn whether the last retransmission has failed in order to determine if it should wake up and listen for a grant of additional resources or if it should transmit a scheduling request. In some examples, the base station 105-*a* may send an additional NACK to the UE 115-*a* signaling that the last HARQ retransmission has failed. In some examples, the additional NACK may be a physical hybrid-ARQ indicator channel (PHICH) NACK. In other examples, the additional NACK may be a different kind of NACK because the PHICH NACK may not be available for asynchronous HARQ. In some examples, the base station 105-*a* may change the modulation and coding scheme and may add TTI bundling after a first set of unsuccessful HARQ retransmissions. In some examples, the modulation and coding scheme and the TTI bundling may be changed before the maximum number of HARQ retransmissions have failed. TTI bundling may be added one-time for this HARQ process (as opposed to RRC configuration for all). In some examples, if there are new packets present in a UE 115-*a* buffer, the UE 115-*a* may use the resulting additional awake time to send the new packets (i.e., the UE 115-*a* can send additional data using the resources indicated in the received grant).

For downlink applications, the base station 105-*a* controls the maximum number of retransmissions (with no corresponding configuration to the UE 115-*a*). In such examples, the base station 105-*a* may keep scheduling resources after the initial HARQ has failed. In some examples, the base station 105-*a* can use a lower modulation and coding scheme or add a TTI bundling. In some examples, the UE 115-*a* may wake up and wait for a grant of additional resources for an additional HARQ procedure from the base station 105-*a*, if a transport block is not decoded correctly at the UE 115-*a* during the initial HARQ procedure.

Figure 4:
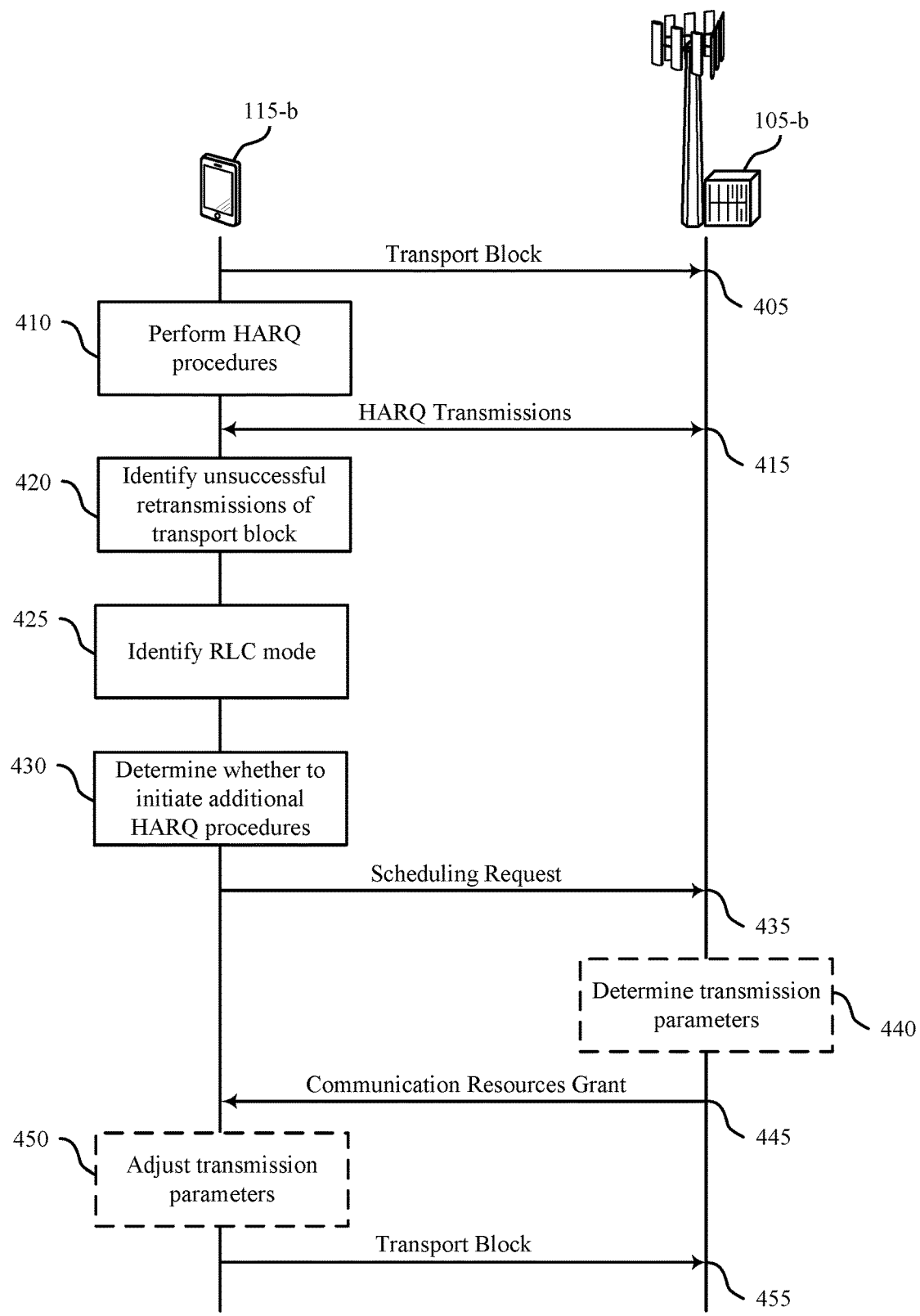
FIG. 4 illustrates an example of a communication scheme that supports techniques to improve data transfer reliability in accordance with one or more aspects of the present disclosure.

FIG. 4 illustrates an example of a communication scheme 400 for techniques to improve data transfer reliability by extending HARQ procedures in accordance with one or more aspects of the present disclosure. The communication scheme 400 discloses techniques to retransmit a transport block after a maximum number of HARQ retransmissions have already occurred. In some examples, the HARQ procedures may be extended based on the RLC layer being in an unacknowledged mode. In the communication scheme 400 a UE 115-*b* is the transmitting entity that transmits and retransmits a transport block 405 and a base station 105-*b* is the receiving entity. The base station 105-*b* may be an example of the base stations 105 described with reference to FIGS. 1-3. The UE 115-*b* may be an example of the UEs 115 described with reference to FIGS. 1-3.

The UE 115-*b* may transmit a transport block 405 to the base station 105-*b*. The transport block 405 may include any payload of data information or control information. In some examples, the UE 115-*b* transmits the transport block 405 based on control information received from the base station 105-*b*.

At block 410, the UE 115-*b* and/or the base station 105-*b*, may perform HARQ procedures to correct any detected errors in the transport block 405. The HARQ procedures may include exchanging a number of HARQ transmissions 415. HARQ transmissions may include HARQ ACKs, HARQ NACKs, retransmissions of transport blocks, other messages, or combinations thereof. In the HARQ procedure, the base station 105-*b* may determine whether the transport block 405 was successfully received at the MAC layer. If the transport block 405 was not successfully received, the base station 105-*b* may transmit a HARQ NACK to the UE 115-*b* indicating that the transport block 405 was not received. The base station 105-*b* may also buffer the transport block 405 and/or any other retransmission of the transport block 405 as part of the HARQ processes. In some examples, the UE 115-*a* may maintain a counter that tracks how many transmissions of the transport block 405 have occurred or how many retransmissions of the transport block 405 have occurred.

At block 420, the UE 115-*b* may identify that a number of transmissions of the transport block 405 satisfies a retransmission threshold. In some examples, the UE 115-*b* may identify that a number of HARQ retransmissions of the transport block 405 satisfies the retransmission threshold. In either event, the function of tracking failed transmissions as part of a HARQ procedure is similar. The retransmission threshold may be modified depending on whether total transmissions of the transport block 405 are being tracked or whether HARQ retransmissions of the transport block 405 are being tracked. The number of transmissions or retransmission may be tracked by a counter maintained by the UE 115-*b*. As part of the identifying, the UE 115-*b* may identify a number of unsuccessful transmission and compare that number to the retransmission threshold.

The retransmission threshold may indicate a maximum number of allowed HARQ retransmissions in a HARQ procedure. In some examples, the retransmission threshold may be dynamically determined by network conditions associated with the communication link between the UE 115-*b* and the base station 105-*b*. In some instances, after the retransmission threshold is satisfied, the HARQ procedure is terminated and the HARQ buffers are flushed. In some examples, the retransmission threshold may be preconfigured. Techniques are described herein to extend HARQ procedures past the maximum number of allowed HARQ retransmissions, or, in other words, initiate additional HARQ procedures, to continue error correction via HARQ. In these procedures, the HARQ buffers may not be flushed and, in some instances, may be considered part of the same HARQ procedure. In some examples, the functions of block 420 are performed at a MAC layer.

In some instances, control information received from the base station 105-*b* may modify a preconfigured retransmission threshold. For example, a retransmission threshold may be preconfigured such that five unsuccessful transmissions of the transport block (four retransmissions) may be performed before the HARQ procedure is terminated. In these examples, control information may be configured to modify the retransmission threshold to another number besides five, such as a greater number such as six, seven, eight, etc. In such situations, the UE 115-*b* may identify that a new retransmission threshold is greater than the preconfigured retransmission threshold such that a different number of unsuccessful transmission of the transport block 405 satisfy the new retransmission threshold.

At block 425, the UE 115-*b* may identify an RLC mode of the transport block 405. For example, the UE 115-*b* may identify that the RLC layer associated with at least a portion of the unsuccessful retransmissions is operating in an unacknowledged. The UE 115-*b* may also identify that the RLC layer is operating in a transparent mode or an acknowledged mode. Because acknowledge mode of the RLC layer includes performing additional ARQ procedures for error correction, the UE 115-*b* may not extend the HARQ procedures when in the acknowledged mode. In contrast, both the unacknowledged mode and the transparent mode of the RLC layer may not include performing those additional ARQ procedures. The UE 115-*b* may extend the HARQ procedures for error correction when in the unacknowledged more or the transparent mode.

At block 430, the UE 115-*b* may determine whether to initiate additional HARQ procedures based on satisfying the retransmission threshold. In some instances, the UE 115-*b* may determine whether to initiate additional HARQ procedures also based on the operation mode of the RLC layer. For example, if the RLC layer is operating in the acknowledged, the UE 115-*b* may not initiate additional HARQ procedures. In some examples, the functions of block 430 are performed at a MAC layer.

The UE 115-*b* may determine whether to initiate additional HARQ procedures in a number of different ways. In some instances, the UE 115-*b* may identify a number of remaining resources (e.g., TTIs) in a transmission period associated with the transport block 405 and compare the number of remaining resources to a resources threshold. The UE 115-*b* may determine that the resources threshold is satisfied based on the comparison. In some examples, the UE 115-*b* performs the determination about the resources threshold based on the retransmission threshold being identified and/or the RLC layer operating in an unacknowledged mode or a transparent mode. The resources threshold may be indicative of a minimum number of remaining resources used to perform additional HARQ procedures. Meaning, the UE 115-*b* may perform additional HARQ procedures if a certain number of resources are available to be used for HARQ.

In other instances, the determination to initiate additional HARQ procedures may be associated with information associated with a bearer. In other instances, the determination to initiate additional HARQ procedures may be included in control information. For example, the control information may indicate that more HARQ retransmissions than those indicated by the retransmission threshold may be performed.

In some instances, the base station 105-*b* may transmit a last HARQ ACK/NACK to indicate that the last HARQ retransmission failed. In some communication systems, one the retransmission threshold is satisfied both the UE 115-*b* and the base station 105-*b* may terminate the HARQ procedure without communicating whether the last retransmission was successful. Because the HARQ procedures may be extended, the last HARQ ACK/NACK may indicate whether the last HARQ retransmission in the HARQ procedure was satisfied. In some examples, the UE 115-*b* may determine whether to initiate HARQ procedures based on this last HARQ ACK/NACK. For example, if an ACK is received, the UE 115-*b* may determine to not initiate additional HARQ procedures. In other examples, if a NACK is received, the UE 115-*b* may determine to initiate additional HARQ procedures. In some examples, the UE 115-*b* may receive, after identifying that the retransmission threshold is satisfied, a message (e.g., HARQ NACK) indicating that a last retransmission of the transport block was not received by a recipient (e.g., base station 105-*b*). In some examples, the UE 115-*b* may transmit or retransmit the transport block 405 based on receiving the message (e.g., HARQ NACK) indicating that a previous transmission of the transport block 405 was not received by a recipient.

Upon determining to initiate additional HARQ procedures, the UE 115-*b* may transmit a scheduling request 435 asking for additional communication resources to perform the additional HARQ procedures. In some examples, the scheduling request 435 is a generic scheduling request asking for communication resources. In some examples, the scheduling request 435 is a special scheduling request asking for communication resources specifically for additional HARQ procedures. In the case of special scheduling requests, the special scheduling request may comprise multiple bits in another underlying message. The UE 115-*b* may transmit a scheduling request 435 that requests communication resources for retransmitting the transport block based on the retransmission threshold being satisfied. In some examples, such a transmission may be based on which mode the RLC is operating in and/or satisfying the remaining resources threshold. In some instances, the scheduling request 435 includes an indication that the scheduling request is for a retransmission of the transport block 405.

At block 440, the base station 105-*b* may determine a number of transmission parameters for the additional HARQ procedures. In some instances, the transmission parameters may be referred to as reliability parameters. The transmission parameters may indicate settings for certain characteristics of the retransmissions of the transport block 405 that are related to the reliability of transmission. For example, the transmission parameters may indicate a level of modulation and coding scheme to be used for the retransmissions of the transport block. The level of the modulation and coding scheme in the transmission parameters may be lower than a previous modulation and coding scheme used in other transmissions or retransmissions of the transport block 405. In other examples, the transmission parameters may indicating that the transport block 405 should be transmitted as part of TTI bundling. In TTI bundling, the transport block may be transmitted in multiple consecutive TTIs. The transmission parameters may be based on the retransmission threshold being satisfied. The transmission parameters may indicate that the transport block 405 should be modified prior to retransmission. In some examples, transmission parameters are not determined.

The base station 105-*b* may transmit a communication resources grant 445 based on receiving the scheduling request 435. In some instances, the communication resources grant 445 may include the transmission parameters. For example, the communication resources grant 445 may include information indicating a new modulation and coding scheme or TTI bundling for the retransmissions of the transport block 405. The communication resources grant 445 may indicate which communication resource (e.g., TTIs) may be used for HARQ procedures and/or HARQ transmissions 415. In some examples, the UE 115-*b* may initiate procedures to wake up to receive the communication resources grant 445.

At block 450, the UE 115-*b* may adjust the transmission parameters associated with the transport block 405. In some examples, the UE 115-*b* receives the transmission parameters from the base station 105-*b* via signaling (e.g., the communication resources grant 445). In some examples, the UE 115-*b* may determine the transmission resources locally. In such examples, the UE 115-*b* may perform the functions of block 440.

The UE 115-*b* may transmit a transport block 455 based on receiving the communication resources grant 445. The transport block 455 may be an example of the transport block 405. In some instances, the transport block 455 is a modified version of the transport block 405. For example, some of the characteristics of the transport block 455 may be different from the transport block 405 based on the transmission parameters. In some examples, the HARQ procedures may include transmitting the transport block 455 multiple times. In some examples, HARQ ACKs and NACKs may be received in response to transmitting the transport block 455.

Figure 5:
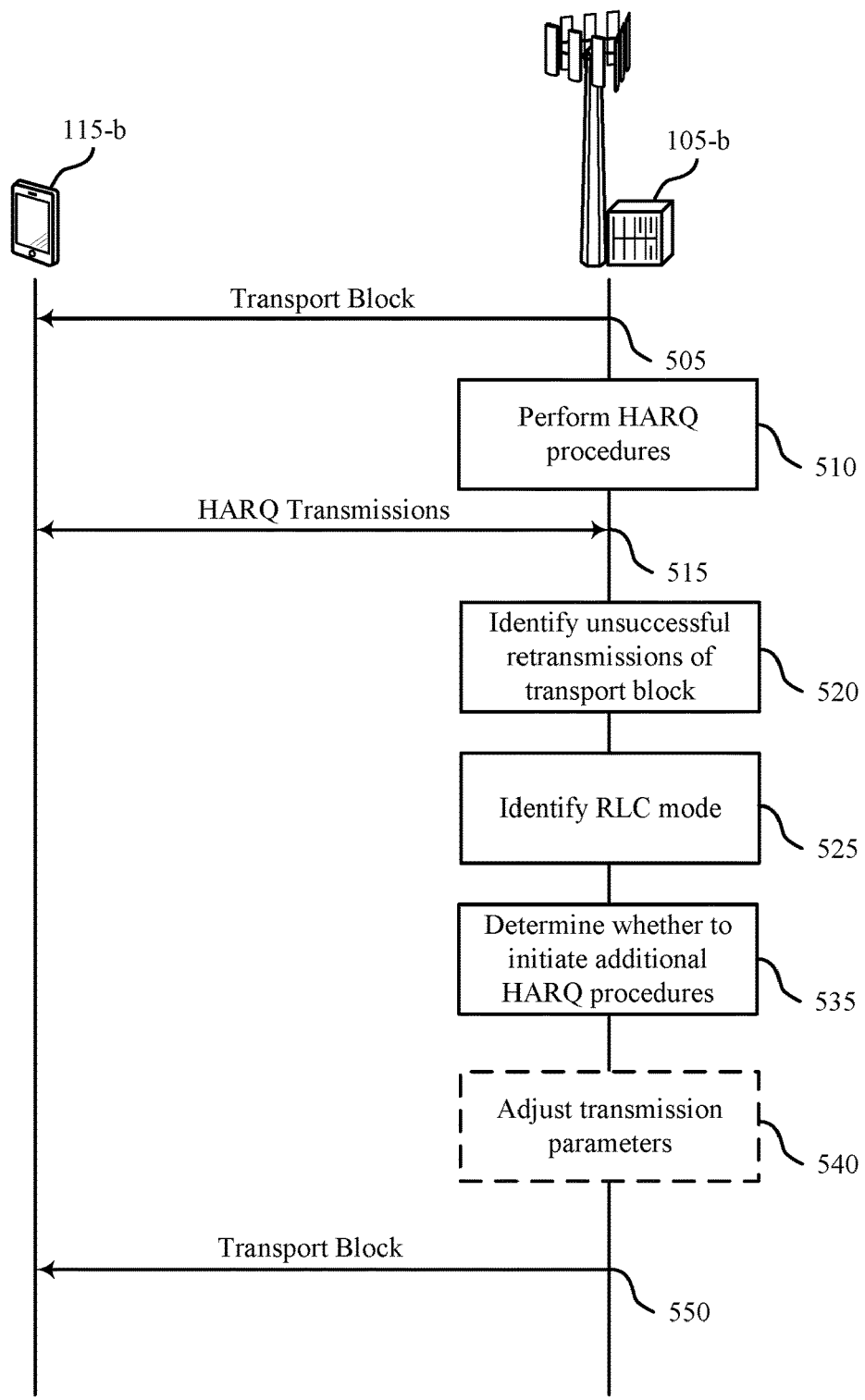
FIG. 5 illustrates an example of a communication scheme that supports techniques to improve data transfer reliability in accordance with one or more aspects of the present disclosure.

FIG. 5 illustrates an example of a communication scheme 500 for techniques to improve data transfer reliability by extending HARQ procedures in accordance with one or more aspects of the present disclosure. The communication scheme 500 discloses techniques to retransmit a transport block after a maximum number of HARQ retransmissions have already occurred. In some examples, the HARQ procedures may be extended based on the RLC layer being in an unacknowledged mode. In the communication scheme 500 a base station 105-*b* is the transmitting entity that transmits and retransmits a transport block 505 and a UE 115-*b* is the receiving entity.

Generally, the operations, processes, procedures, and messages outlined in the communication scheme 400 apply to communication scheme 500 except the roles of the UE 115-*b* and the base station 105-*b* are swapped. As such, functions of the communication scheme 400 that are also part of the communication scheme 500 are not repeated here. Rather, the differences between the communication scheme 500 and communication scheme 400 are discussed. Messages and blocks of communication scheme 500 having similar names and/or similar numbering as messages and block in communication scheme 400 may be embodied similarly.

When the base station 105-*b* is the transmitting entity the UE 115-*b* may not generate and transmit a scheduling request. Rather, the base station 105-*b* may allocate communication resources automatically without interaction with the UE 115-*b*.

At block 535, the base station 105 may determine whether to initiate additional HARQ procedures based on the resources threshold being satisfied, the retransmission threshold being satisfied, the operation mode of the RLC layer, receiving a last HARQ NACK from the UE 115-*b*, or combinations thereof. In some examples, the UE 115-*b* may transmit a last HARQ response indicating whether the last HARQ retransmission prior to satisfying the retransmission threshold was successful or not successful.

Prior to transmitting the transport block 550, the base station 105-*b* may in some instances transmit control signaling to the UE 115-*b* indicating that additional HARQ procedures are being performed and the parameters of those HARQ procedures. For example, the control signaling may indicate transport parameters of the transport block 550. In some examples, the UE 115-*b* may be configured to wake-up and listen for the transport block 550 at a predetermined time after the last HARQ retransmission of the transport block 505.

Figure 6:
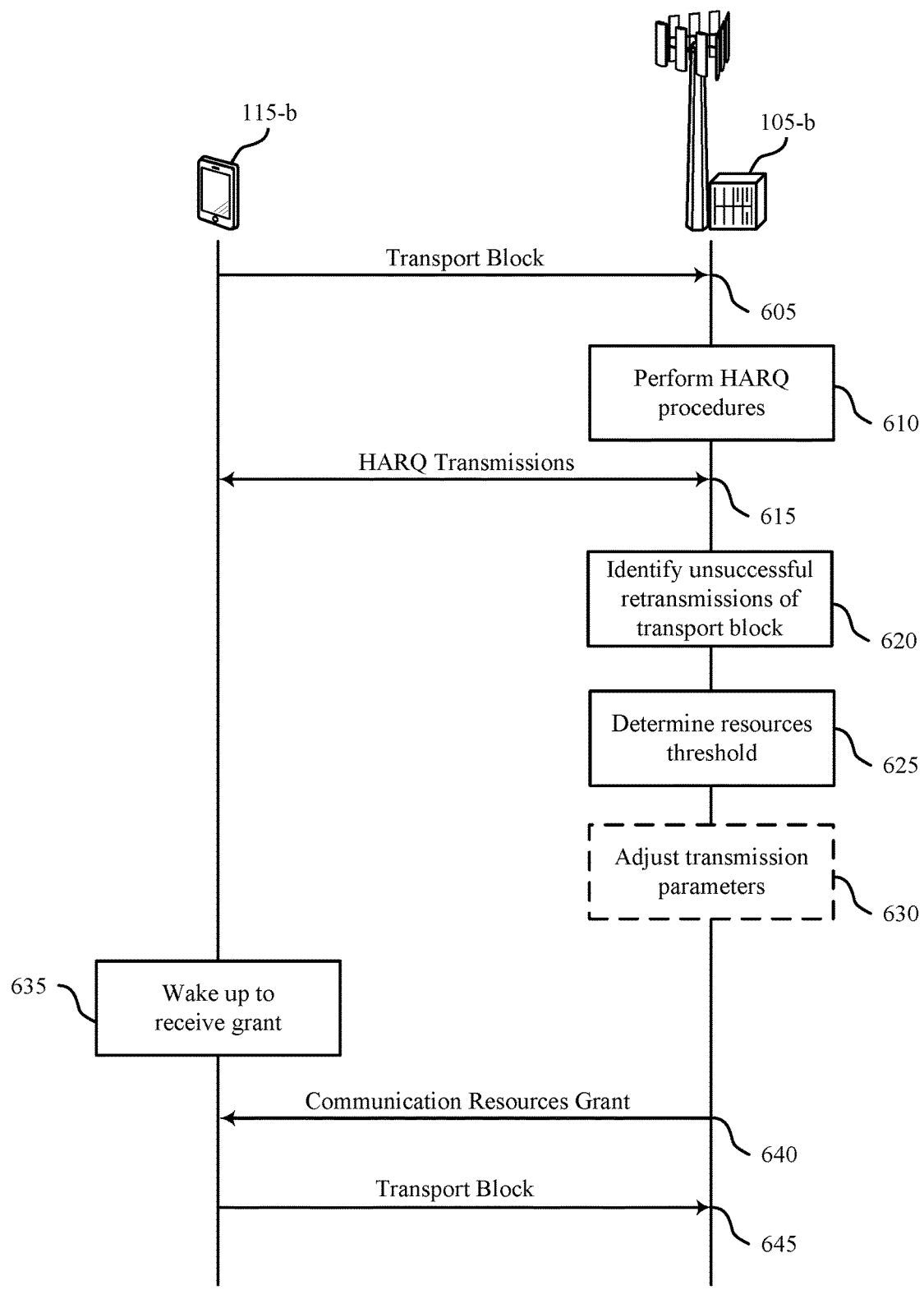
FIG. 6 illustrates an example of a communication scheme that supports techniques to improve data transfer reliability in accordance with one or more aspects of the present disclosure.

FIG. 6 illustrates an example of a communication scheme 500 for techniques to improve data transfer reliability by extending HARQ procedures in accordance with one or more aspects of the present disclosure. The communication scheme 600 discloses techniques to retransmit a transport block after a maximum number of HARQ retransmissions have already occurred. In some examples, the HARQ procedures may be extended based on the RLC layer being in an unacknowledged mode. In the communication scheme 600, a UE 115-*b* is the transmitting entity that transmits and retransmits a transport block 605 and a base station 105-*b* is the receiving entity.

In the communication scheme 600, however, the determinations about whether to initiate additional HARQ procedures is performed by the receiving entity, in this case the base station 105-*b*. Generally, the operations, processes, procedures, and messages outlined in the communication scheme 500 apply to communication scheme 600 except that the base station 105-*b* is the receiving entity rather than the transmitting entity. As such, functions of the communication scheme 500 that are also part of the communication scheme 600 are not repeated here. Rather, the differences between the communication scheme 600 and communication scheme 500 are discussed. Messages and blocks of communication scheme 600 having similar names and/or similar numbering as messages and block in communication scheme 500 may be embodied similarly.

When the base station 105-*b* as a receiving entity makes these HARQ procedure indications, the base station 105-*b* may not receive the last HARQ response from the UE 115-*b*, because the UE 115-*b* is the transmitting entity. At block 625, upon determining that the last HARQ retransmission has failed, the base station 105-*b* determine to initiate HARQ procedures based on the information discussed herein. However, the base station 105-*b* may communicate to the UE 115-*b* that it should perform additional HARQ procedures via a communication resources grant 640. In some examples, the base station 105-*b* may generate the communication resources grant without additional interactions with the UE 115-*b*. The UE 115-*b* may perform several additional operations to accommodate these additional HARQ procedures. The UE 115-*b* may wait to flush its HARQ buffers until after the certain time period. At block 635, the UE 115-*b* may be configured to wake-up and listen for the communication resources grant 640 at a predetermined time after the last HARQ retransmission of the transport block 605. As the receiving entity, the base station 105-*b* may not have access to what mode the RLC layer associated with the transport block 605 is operating in. As such, in some examples, the base station 105-*b* may not determine the mode of operation of the RLC layer.

In other examples, the UE 115-*b* may determine whether to initiate additional HARQ procedures as the receiving entity, rather than as the transmitting entity. In these examples, the base station 105-*b* may be the transmitting entity. The communication scheme 400 described with reference to FIG. 4 may be modified to account for differences in decision making of the UE 115-*b* as the receiving entity rather than the transmitting entity. For example, the UE 115-*b* may not perform the functions of block 425 as the receiving entity, in some examples. In other examples, the UE 115-*b* may not transmit a last HARQ response but rather merely transmit a scheduling request to request to the base station 105-*b* that additional HARQ procedures be initiated.

Figure 7:
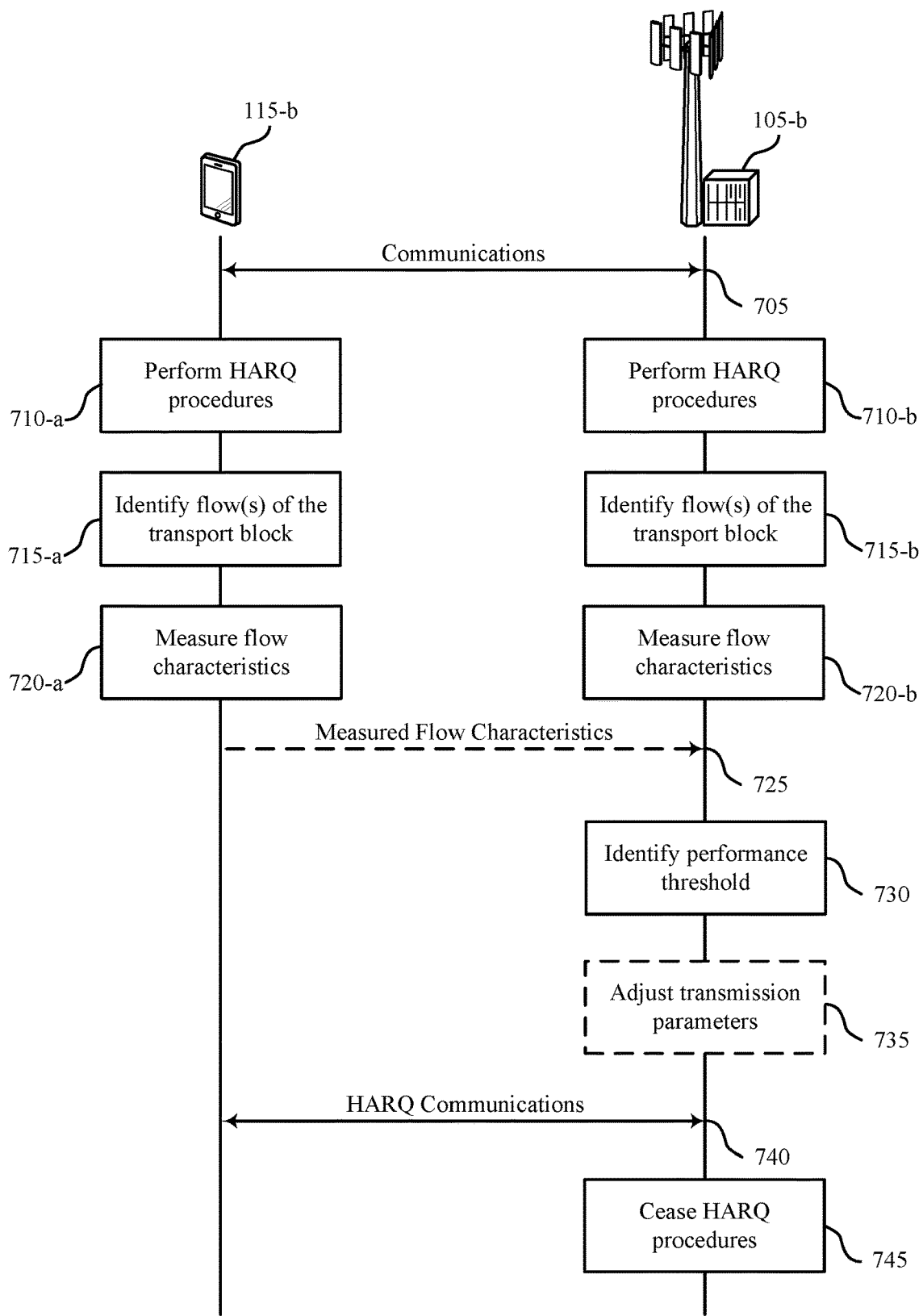
FIG. 7 illustrates an example of a communication scheme that supports techniques to improve data transfer reliability in accordance with aspects of the present disclosure.

FIG. 7 illustrates an example of a communication scheme 700 for techniques to improve data transfer reliability by extending HARQ procedures in accordance with one or more aspects of the present disclosure. The communication scheme 700 illustrates dynamically controlling the number of HARQ retransmissions based on flow characteristics of one or more data flows communicated between a UE 115-*b* and a base station 105-*b*. The communication scheme 700 illustrates both uplink and downlink situations in a wireless communication system.

The UE 115-*b* and the base station 105-*b* may exchange communications 705 as part of operating in a wireless communication system. The communications 705 may include user-plane information and/or control-plane information. The communications 705 may take the form of transport blocks, packets, flows, or combinations thereof. In some cases, HARQ procedures may be utilized to detect and correct errors that occur during transmission.

At block 710, the UE 115-*b* and/or the base station 105-*b* may initiate HARQ procedures based on the communications 705. The various functions of the UE 115-*b* and the base station 105-*b* may vary based on whether the HARQ procedure is being performed in a downlink context or an uplink context. Typical HARQ procedures may be modified by the functions of blocks 715-735.

At block 715, the UE 115-*b* (e.g., in downlink) or the base station 105-*b* (e.g., in uplink), may identify one or more flows in a communication. Data in a transmission may be grouped into a flow based on one or more attributes of the data. For example, data of similar types may be grouped into a first flow of a transmission (e.g., a voice flow), while data of other similar types may be grouped into a second flow of the transmission (e.g., a data flow). Attributes of the transmitted data that may be used to grouped data into flows may be an IP source address, an IP destination address, a source port, a destination port, a protocol type, a type of data, a class of service, a router or switch interface or combinations thereof.

At block 720, the UE 115-b (e.g., in downlink) or the base station 105-b (e.g., in uplink), may identify one or more flow characteristics of the one or more flows of the transmission. For example, the UE 115-b or base station 105—may measure one or more flow characteristics of the one or more flows. The flow characteristics of each flow may include a packet error rate, a time-delay of data transmissions, effective jitter of data transmissions, or throughput, or combinations thereof. In some examples, the measuring of flow characteristics may be ongoing for an established communication link. For a given communication link, the UE 115-b or the base station 105-a may maintain a record of recently measured flow characteristics of the communication link. In some cases, actions may be based on these generalized flow characteristics of the communication link rather than specific flow characteristics of the transmission or transport block in question. In some examples, such as in downlink contexts, the UE 115-b may transmit a message to the base station 105-b that includes the measured flow characteristics.

At block 730, the base station 105-b may identify performance thresholds associated with the flow based on the flow characteristics. The performance thresholds may be performance benchmarks that are associated with certain types of flows. For example, voice flows may require low-latency but may tolerate some packet loss to achieve such a low-latency. In contrast, data flows may require less packet loss but may tolerate additional latency to achieve such low packet loss (e.g., packet error rate).

In some cases, the performance thresholds may be identified based on the type of flow identified. Some types of flows may be have pre-determined performance benchmarks or performance thresholds associated with them. In some cases, the performance benchmarks may be based on variety of factors include the type of flow, the type of data being transmitted, other communication link parameters, or combinations thereof.

In some cases, the base station 105-b may determine whether the measured flow characteristics satisfy the relevant performance threshold. The base station 105-b may compare the flow characteristic to its relevant performance threshold.

The base station 105-b may modify the number of HARQ transmission or a maximum number of allowed HARQ transmissions based on whether the performance threshold is satisfied. For example, if the packet error rate for given flow is better (e.g., lower) than the performance threshold for the packet error rate, the base station 105-b may reduce the maximum number of HARQ retransmissions for the flow because the system can tolerate a few more dropped packets. In another example, if the packet error rate for a given flow is worse (e.g., higher) than the performance threshold for the packet error rate, the base station 105-b may continue to request HARQ retransmissions until the; the performance threshold is satisfied by the packet error rate.

In some examples, the base station 105-b may request HARQ transmissions after the transmission period associated with the transport block in question has expired. In such examples, the base station 105-b may be performing two or more HARQ procedures for two or more different transport blocks at the same time.

At block 735, the UE 115-b or the base station 105-b may optionally adjust the transmission parameters associated with the transport block in question. In some examples, the UE 115-b receives the transmission parameters from the base station 105-b via signaling (e.g., the communication resources grant 445). In some examples, the UE 115-b may determine the transmission resources locally.

As part of performing the HARQ procedure, the UE 115-b and the base station 105-b may exchange HARQ communications 740. HARQ communications 740 may include HARQ retransmissions, grants of communication resources for HARQ retransmissions, ACKs, NACKs, other control signaling, or combinations thereof.

The functions of blocks 715-735 may be performed at any time during the HARQ procedure. In some examples, the functions of blocks 715-735 may be performed in parallel with more standard HARQ procedures. In such examples, the base station 105-b may dynamically adjust the total number of HARQ retransmission while the HARQ procedure is being performed. In some examples, the functions of blocks 715-735 may be performed before transmitting the HARQ communications 740.

At block 745, the base station 105-b may cease performing the HARQ procedures based on a variety of circumstances being met. In some examples, the base station 105-b may cease the HARQ procedure upon determining that the data was successfully decoded by a receiving entity. In uplink contexts, the base station 105-b may determine that the data was successfully decoded directly. In downlink contexts, the base station 105-b may receive an ACK indicating that the data was successfully decoded. In some examples, the base station 105-b may cease HARQ procedures based on one or more flow characteristics satisfying their respective performance thresholds. For example, if the packet error rate of a flow is well within an acceptable value, the base station 105-b may terminate the HARQ procedure because losing a few additional packets may be within acceptable limits.

Figure 8:
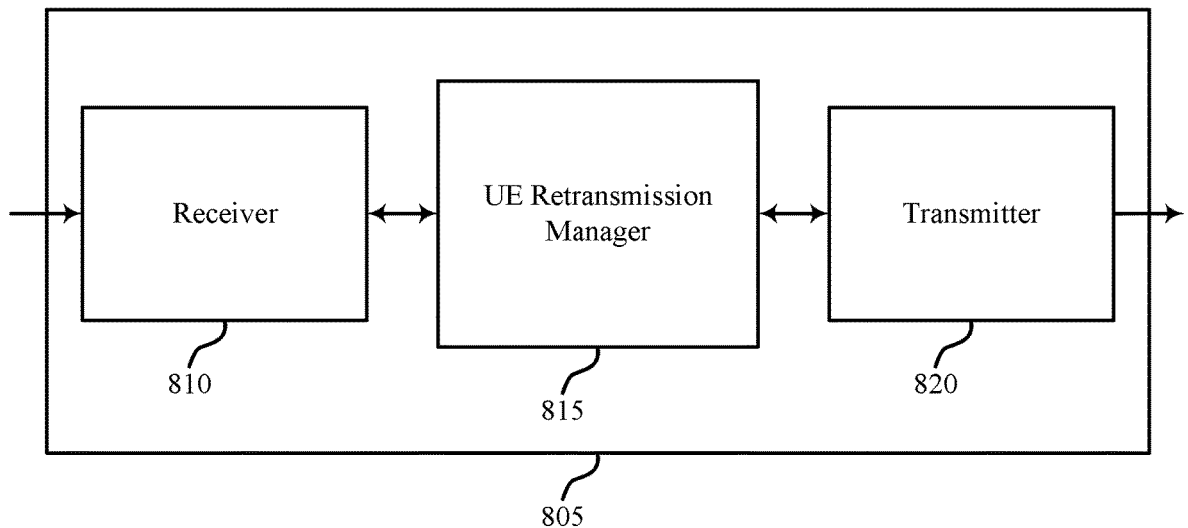
FIGS. 8 through 10 show block diagrams of a device that supports techniques to improve data transfer reliability in accordance with aspects of the present disclosure.

FIG. 8 shows a block diagram 800 of a wireless device 805 that supports techniques to improve data transfer reliability in accordance with aspects of the present disclosure. Wireless device 805 may be an example of aspects of a UE 115 as described herein. Wireless device 805 may include receiver 810, UE retransmission manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to techniques to improve data transfer reliability, etc.). Information may be passed on to other components of the device. The receiver 810 may be an example of aspects of the transceiver 1135 described with reference to FIG. 11. The receiver 810 may utilize a single antenna or a set of antennas.

UE retransmission manager 815 may be an example of aspects of the UE retransmission manager 1115 described with reference to FIG. 11. UE retransmission manager 815 and/or at least some of its various sub-components may be implemented in hardware, software executed by a processor, firmware, or any combination thereof. If implemented in software executed by a processor, the functions of the UE retransmission manager 815 and/or at least some of its various sub-components may be executed by a general-purpose processor, a DSP, an ASIC, a field-programmable gate array (FPGA) or other programmable logic device, discrete gate or transistor logic, discrete hardware components, or any combination thereof designed to perform the functions described in the present disclosure. The UE retransmission manager 815 and/or at least some of its various sub-components may be physically located at various positions, including being distributed such that portions of functions are implemented at different physical locations by one or more physical devices. In some examples, UE retransmission manager 815 and/or at least some of its various sub-components may be a separate and distinct component in accordance with various aspects of the present disclosure. In other examples, UE retransmission manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE retransmission manager 815 may receive a transport block during a transmission period including more than one frame, measure a flow characteristic of a data flow communicated during the transmission period as part of a HARQ, the measuring being based on the transport block failing to be successfully decoded, and transmit a message indicating the flow characteristic to a base station. The UE retransmission manager 815 may also transmit a transport block during a transmission period including more than one frame, identify that a retransmission threshold is satisfied based on a time duration since a beginning of the transmission period associated with the transport block, and retransmit the transport block based on the retransmission threshold being satisfied.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
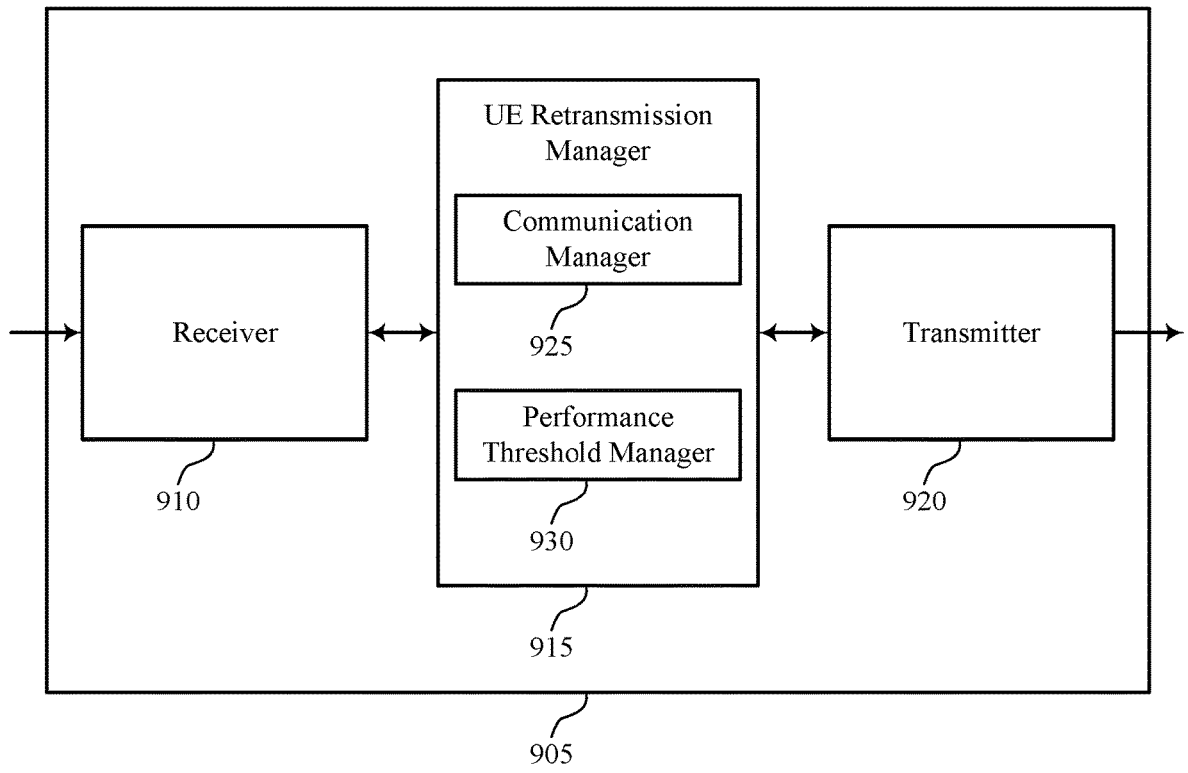

FIG. 9 shows a block diagram 900 of a wireless device 905 that supports techniques to improve data transfer reliability in accordance with aspects of the present disclosure. Wireless device 905 may be an example of aspects of a wireless device 805 or a UE 115 as described with reference to FIG. 8. Wireless device 905 may include receiver 910, UE retransmission manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques to improve data transfer reliability, etc.). Information may be passed on to other components of the device. The receiver 910 may be an example of aspects of the transceiver 1135 described with reference to FIG. 11. The receiver 910 may utilize a single antenna or a set of antennas.

UE retransmission manager 915 may be an example of aspects of the UE retransmission manager 1115 described with reference to FIG. 11. UE retransmission manager 915 may also include communication manager 925 and performance threshold manager 930.

Communication manager 925 may receive a transport block during a transmission period including more than one frame, transmit the transport block based on receiving a HARQ NACK indicating that a previous transmission of the transport block was not received by a recipient, transmit a message indicating the flow characteristic to a base station, determine that the transport block failed to be successfully decoded, where measuring the flow characteristic is based on the determination, measure a flow characteristic of a data flow communicated during the transmission period as part of a HARQ, the measuring being based on the transport block failing to be successfully decoded, retransmit the transport block based on the retransmission threshold being satisfied, receive, after identifying that the retransmission threshold is satisfied, a message indicating that a last retransmission of the transport block was not received by a recipient, and transmit a transport block during a transmission period including more than one frame. In some cases, the flow characteristic includes: jitter, packet error rate, time-delay, throughput, or combinations thereof. In some cases, the determining and the retransmitting is performed at a MAC layer. In some cases, a UE transmits the scheduling request to a base station.

Performance threshold manager 930 may identify that a retransmission threshold is satisfied based on a time duration since a beginning of the transmission period associated with the transport block and identify a second retransmission threshold that is greater than the retransmission threshold, where a number of unsuccessful retransmissions of the transport block satisfy the second retransmission threshold. In some cases, the retransmission threshold is satisfied after an allowed number of retransmissions of the transport block associated with a logical channel have failed.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
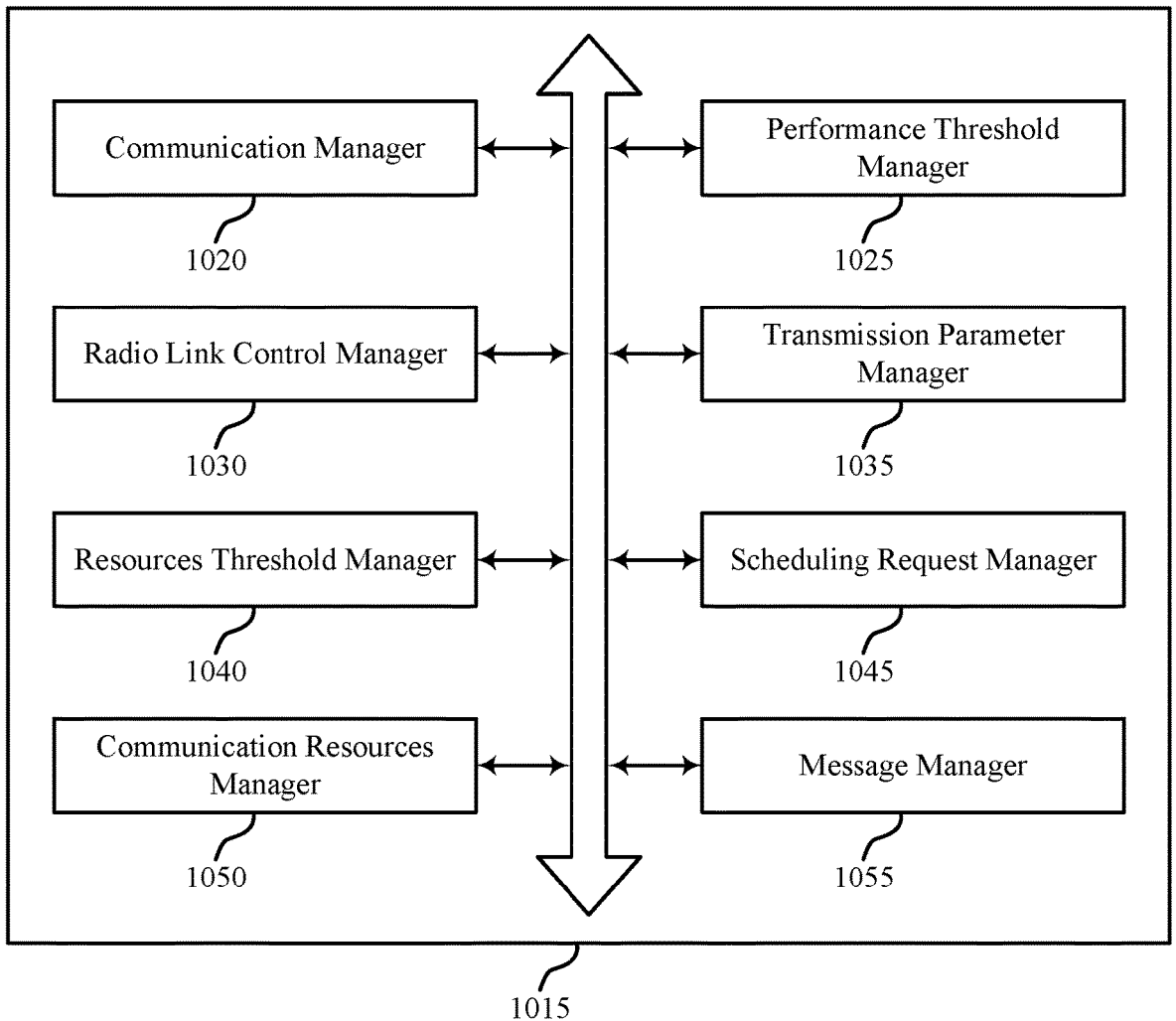

FIG. 10 shows a block diagram 1000 of a UE retransmission manager 1015 that supports techniques to improve data transfer reliability in accordance with aspects of the present disclosure. The UE retransmission manager 1015 may be an example of aspects of a UE retransmission manager 1115 described with reference to FIGS. 8, 9, and 11. The UE retransmission manager 1015 may include communication manager 1020, performance threshold manager 1025, radio link control manager 1030, transmission parameter manager 1035, resources threshold manager 1040, scheduling request manager 1045, communication resources manager 1050, and message manager 1055. Each of these modules may communicate, directly or indirectly, with one another (e.g., via one or more buses).

Communication manager 1020 may receive a transport block during a transmission period including more than one frame, transmit the transport block based on receiving a HARQ NACK indicating that a previous transmission of the transport block was not received by a recipient, transmit a message indicating the flow characteristic to a base station, determine that the transport block failed to be successfully decoded, where measuring the flow characteristic is based on the determination, measure a flow characteristic of a data flow communicated during the transmission period as part of a HARQ, the measuring being based on the transport block failing to be successfully decoded, retransmit the transport block based on the retransmission threshold being satisfied, receive, after identifying that the retransmission threshold is satisfied, a message indicating that a last retransmission of the transport block was not received by a recipient, and transmit a transport block during a transmission period including more than one frame. In some cases, the flow characteristic includes: jitter, packet error rate, time-delay, throughput, or combinations thereof. In some cases, the determining and the retransmitting is performed at a MAC layer. In some cases, a UE transmits the scheduling request to a base station.

Performance threshold manager 1025 may identify that a retransmission threshold is satisfied based on a time duration since a beginning of the transmission period associated with the transport block and identify a second retransmission threshold that is greater than the retransmission threshold, where a number of unsuccessful retransmissions of the transport block satisfy the second retransmission threshold. In some cases, the retransmission threshold is satisfied after an allowed number of retransmissions of the transport block associated with a logical channel have failed.

Radio link control manager 1030 may identify that a radio link control (RLC) layer is operating in an unacknowledged mode.

Transmission parameter manager 1035 may adjust a modulation and coding scheme of the transport block based on the retransmission threshold being satisfied and retransmit the transport block in consecutive TTIs based on the retransmission threshold being satisfied.

Resources threshold manager 1040 may determine that a resources threshold is satisfied based on the retransmission threshold being satisfied and the RLC layer operating in an unacknowledged mode, compare TTIs remaining in the transmission period to the resources threshold, where determining the resources threshold is satisfied is based on the comparison, and compare a second time duration remaining in the transmission period to the retransmission threshold, where identifying that the retransmission threshold is satisfied is based on the comparison.

Scheduling request manager 1045 may transmit a scheduling request that requests communication resources for retransmitting the transport block based on the retransmission threshold being satisfied. In some cases, the scheduling request includes an indication that the scheduling request is for a retransmission of the transport block.

Communication resources manager 1050 may receive a grant of communication resources that includes a reliability parameter associated with the transport block, where the reliability parameter indicates that the transport block should be modified prior to retransmission. In some cases, the grant of communication resources includes a new modulation and coding scheme associated with the transport block. In some cases, the grant of communication resources indicates that the transport block it to be transmitted in consecutive TTIs based on the retransmission threshold being satisfied.

Message manager 1055 may receive, after identifying that the retransmission threshold is satisfied, a message indicating that a last retransmission of the transport block was not received by a recipient. In some cases, the transport block are sent as part of a HARQ procedure.

Figure 11:
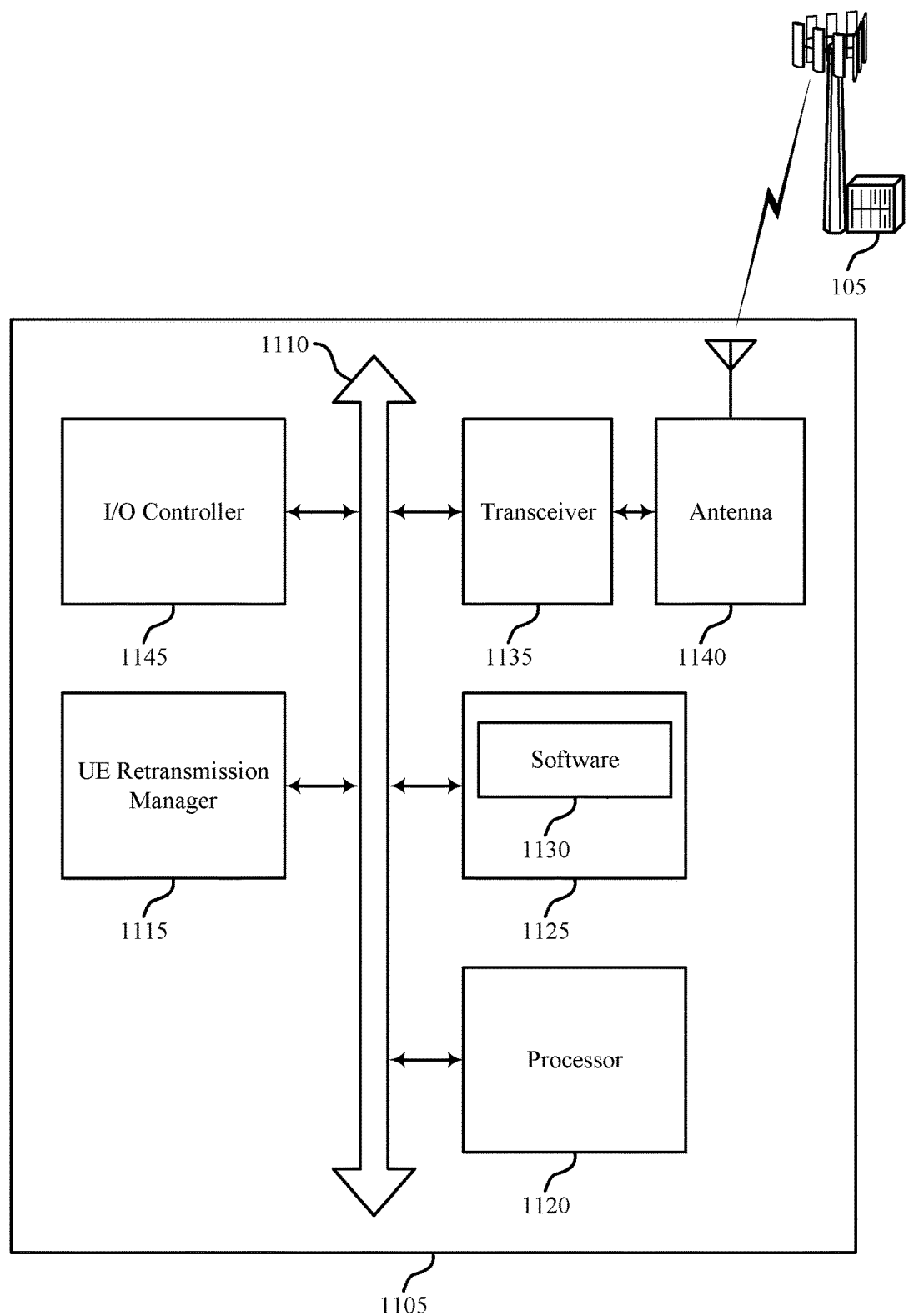
FIG. 11 illustrates a block diagram of a system including a base station that supports techniques to improve data transfer reliability in accordance with aspects of the present disclosure.

FIG. 11 shows a diagram of a system 1100 including a device 1105 that supports techniques to improve data transfer reliability in accordance with aspects of the present disclosure. Device 1105 may be an example of or include the components of UE 115 as described above, e.g., with reference to FIG. 1. Device 1105 may include components for bi-directional voice and data communications including components for transmitting and receiving communications, including UE retransmission manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting techniques to improve data transfer reliability).

Memory 1125 may include random access memory (RAM) and read only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to implement aspects of the present disclosure, including code to support techniques to improve data transfer reliability. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
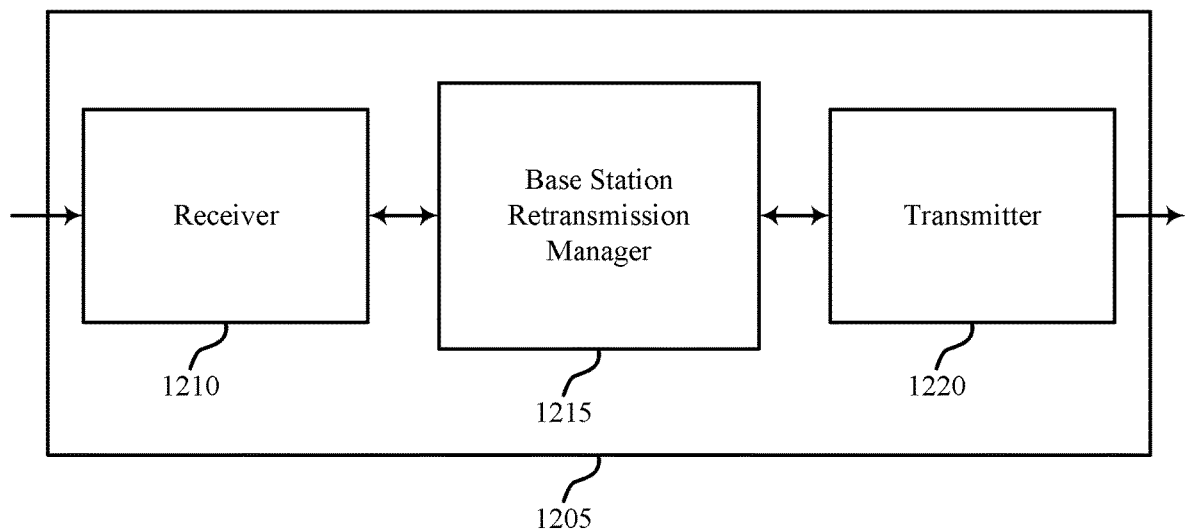
FIGS. 12 through 14 show block diagrams of a device that supports techniques to improve data transfer reliability in accordance with aspects of the present disclosure.

FIG. 12 shows a block diagram 1200 of a wireless device 1205 that supports techniques to improve data transfer reliability in accordance with aspects of the present disclosure. Wireless device 1205 may be an example of aspects of a base station 105 as described herein. Wireless device 1205 may include receiver 1210, base station retransmission manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques to improve data transfer reliability, etc.). Information may be passed on to other components of the device. The receiver 1210 may be an example of aspects of the transceiver 1535 described with reference to FIG. 15. The receiver 1210 may utilize a single antenna or a set of antennas.

Base station retransmission manager 1215 may be an example of aspects of the base station retransmission manager 1515 described with reference to FIG. 15. Base station retransmission manager 1215 and/or at least some of its various sub-components may be implemented in hardware, software executed by a processor, firmware, or any combination thereof. If implemented in software executed by a processor, the functions of the base station retransmission manager 1215 and/or at least some of its various sub-components may be executed by a general-purpose processor, a digital signal processor (DSP), an application-specific integrated circuit (ASIC), a FPGA or other programmable logic device, discrete gate or transistor logic, discrete hardware components, or any combination thereof designed to perform the functions described in the present disclosure. The base station retransmission manager 1215 and/or at least some of its various sub-components may be physically located at various positions, including being distributed such that portions of functions are implemented at different physical locations by one or more physical devices. In some examples, base station retransmission manager 1215 and/or at least some of its various sub-components may be a separate and distinct component in accordance with various aspects of the present disclosure. In other examples, base station retransmission manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station retransmission manager 1215 may identify a flow characteristic of a data flow communicated during a transmission period including more than one frame, identify a performance threshold based on the flow characteristic, and initiate a retransmission of a transport block based on satisfying the performance threshold. The base station retransmission manager 1215 may also receive a transport block during a transmission period including more than one frame, identify that a retransmission threshold is satisfied based on a time duration since a beginning of the transmission period associated with the transport block, and transmit an ACK indicating that a last retransmission of the transport block was not received based on the retransmission threshold being satisfied.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
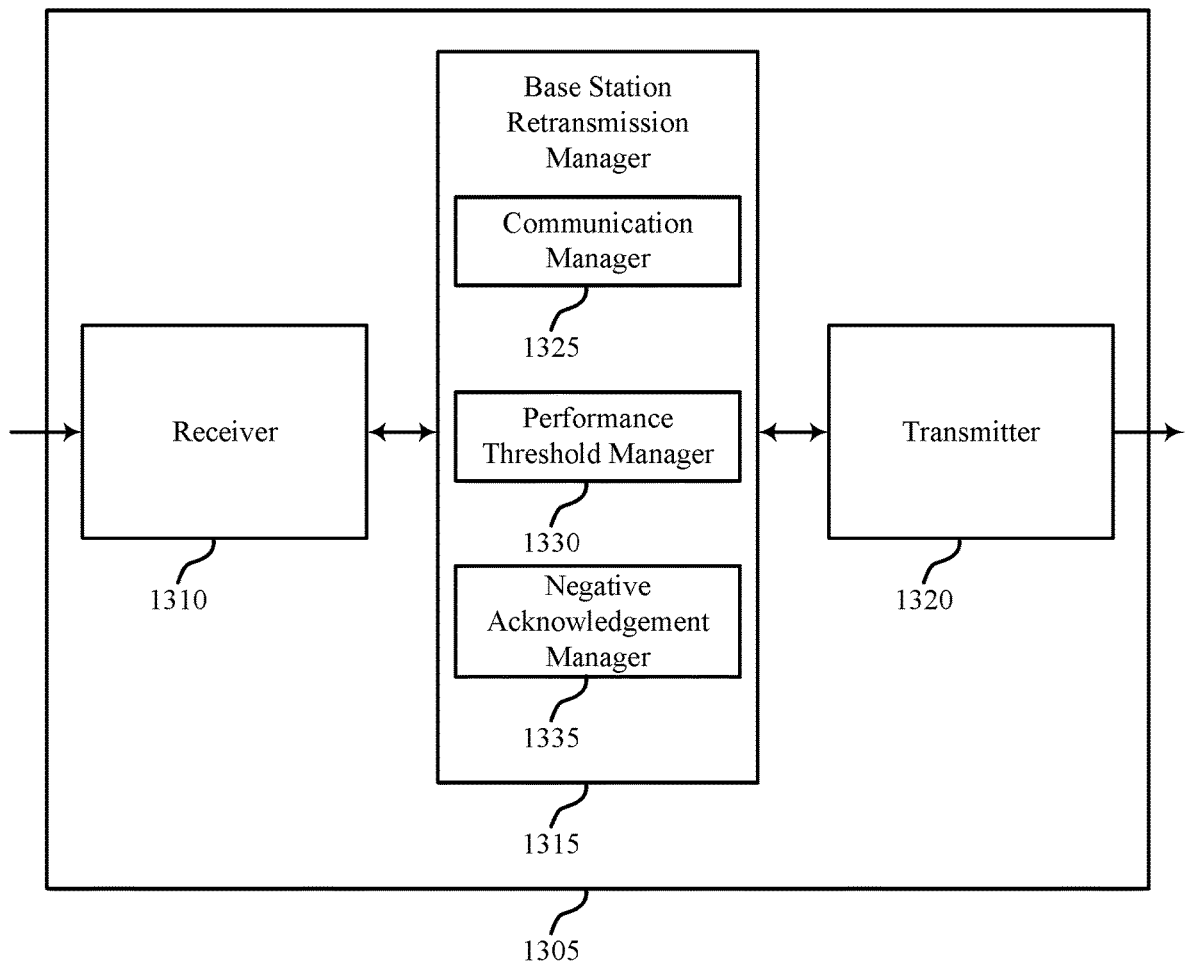

FIG. 13 shows a block diagram 1300 of a wireless device 1305 that supports techniques to improve data transfer reliability in accordance with aspects of the present disclosure. Wireless device 1305 may be an example of aspects of a wireless device 1205 or a base station 105 as described with reference to FIG. 12. Wireless device 1305 may include receiver 1310, base station retransmission manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques to improve data transfer reliability, etc.). Information may be passed on to other components of the device. The receiver 1310 may be an example of aspects of the transceiver 1535 described with reference to FIG. 15. The receiver 1310 may utilize a single antenna or a set of antennas.

Base station retransmission manager 1315 may be an example of aspects of the base station retransmission manager 1515 described with reference to FIG. 15. Base station retransmission manager 1315 may also include communication manager 1325, performance threshold manager 1330, and negative acknowledgement manager 1335.

Communication manager 1325 may identify a flow characteristic of a data flow communicated during a transmission period including more than one frame, initiate a retransmission of a transport block based on satisfying the performance threshold, receive the transport block during the transmission period, where identifying the flow characteristic is based on the received transport block, transmit the transport block during the transmission period, where identifying the flow characteristic is based on the transmitted transport block, receive a transport block during a transmission period including more than one frame, and receive a retransmission of the transport block after satisfying the retransmission threshold. In some cases, the determining and the transmitting is performed by a media access control (MAC) layer. In some cases, the transport block is retransmitted after the transmission period has ended. In some cases, the flow characteristic includes jitter. In some cases, the flow characteristic includes packet error rate. In some cases, the flow characteristic includes time-delay. In some cases, the flow characteristic includes throughput.

Performance threshold manager 1330 may identify a performance threshold based on the flow characteristic, determine that a time duration remaining during the transmission period is less than the performance threshold, where initiating the retransmission of the transport block is based on the time duration being less than the performance threshold, determine that a number of transmissions of the transport block during the transmission period is less than the performance threshold, where initiating the retransmission of the transport block is based on the number of transmissions being less than the performance threshold, and identify that a retransmission threshold is satisfied based on a time duration since a beginning of the transmission period associated with the transport block. In some cases, the retransmission threshold is satisfied after an allowed number of retransmissions of the transport block associated with a logical channel have failed.

Negative acknowledgement manager 1335 may transmit a NACK indicating that a last retransmission of the transport block was not received based on the retransmission threshold being satisfied and transmit a HARQ NACK based on being unable to decode the transport block transmitted by a remote source. In some cases, the NACK is associated with a grant of communication resources generated after determining that the retransmission threshold is satisfied.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
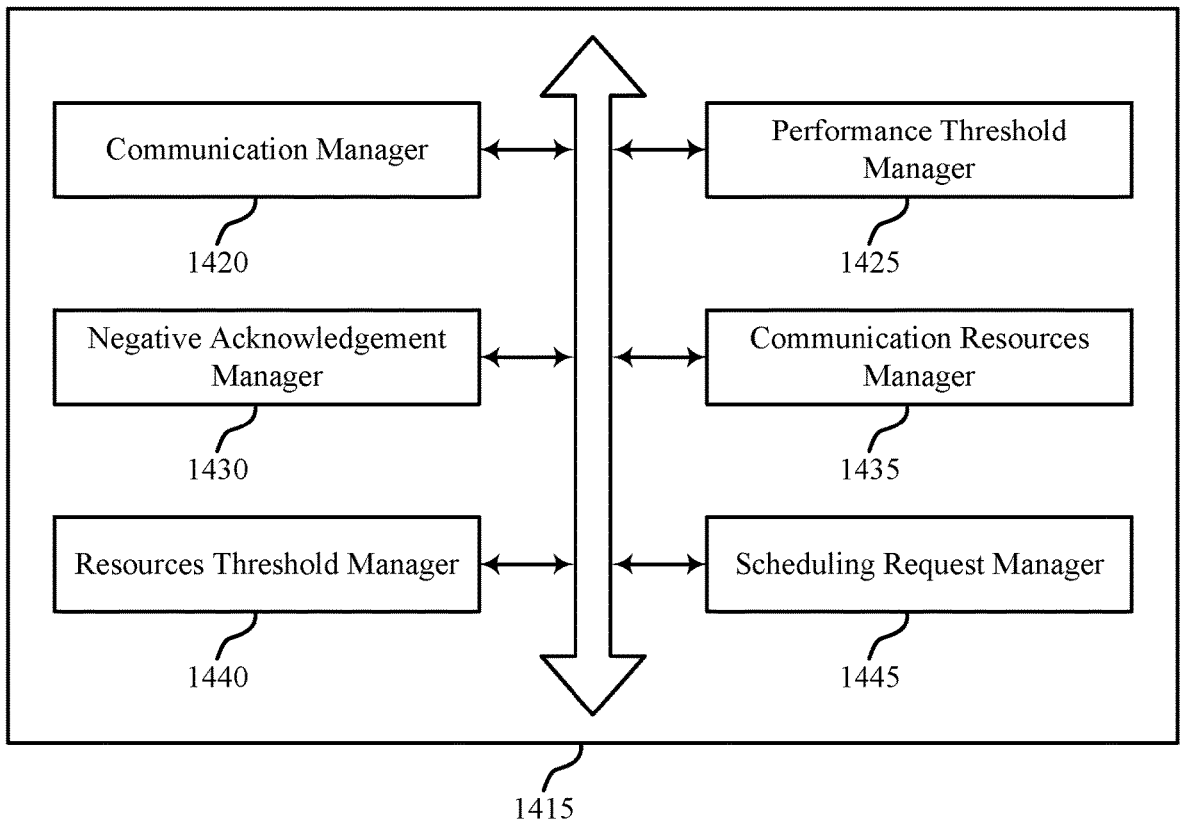

FIG. 14 shows a block diagram 1400 of a base station retransmission manager 1415 that supports techniques to improve data transfer reliability in accordance with aspects of the present disclosure. The base station retransmission manager 1415 may be an example of aspects of a base station retransmission manager 1215, a base station retransmission manager 1315, or a base station retransmission manager 1515 described with reference to FIGS. 12, 13, and 15. The base station retransmission manager 1415 may include communication manager 1420, performance threshold manager 1425, negative acknowledgement manager 1430, communication resources manager 1435, resources threshold manager 1440, and scheduling request manager 1445. Each of these modules may communicate, directly or indirectly, with one another (e.g., via one or more buses).

Communication manager 1420 may identify a flow characteristic of a data flow communicated during a transmission period including more than one frame, initiate a retransmission of a transport block based on satisfying the performance threshold, receive the transport block during the transmission period, where identifying the flow characteristic is based on the received transport block, transmit the transport block during the transmission period, where identifying the flow characteristic is based on the transmitted transport block, receive a transport block during a transmission period including more than one frame, and receive a retransmission of the transport block after satisfying the retransmission threshold. In some cases, the determining and the transmitting is performed by a MAC layer. In some cases, the transport block is retransmitted after the transmission period has ended. In some cases, the flow characteristic includes jitter. In some cases, the flow characteristic includes packet error rate. In some cases, the flow characteristic includes time-delay. In some cases, the flow characteristic includes throughput.

Performance threshold manager 1425 may identify a performance threshold based on the flow characteristic, determine that a time duration remaining during the transmission period is less than the performance threshold, where initiating the retransmission of the transport block is based on the time duration being less than the performance threshold, determine that a number of transmissions of the transport block during the transmission period is less than the performance threshold, where initiating the retransmission of the transport block is based on the number of transmissions being less than the performance threshold, and identify that a retransmission threshold is satisfied based on a time duration since a beginning of the transmission period associated with the transport block. In some cases, the retransmission threshold is satisfied after an allowed number of retransmissions of the transport block associated with a logical channel have failed.

Negative acknowledgement manager 1430 may transmit a NACK indicating that a last retransmission of the transport block was not received based on the retransmission threshold being satisfied and transmit a HARQ NACK based on being unable to decode the transport block transmitted by a remote source. In some cases, the NACK is associated with a grant of communication resources generated after determining that the retransmission threshold is satisfied.

Communication resources manager 1435 may determine that the transport block failed to be successfully decoded, where identifying the performance threshold is based on the transport block failing to be successfully decoded. In some cases, initiating the retransmission of the transport block further includes: transmitting a grant of resources to be used to retransmit the transport block based on satisfying the performance threshold. In some cases, initiating the retransmission of the transport block further includes: retransmitting the transport block based on satisfying the performance threshold. In some cases, the grant of communication resources includes a new modulation and coding scheme associated with the transport block. In some cases, the grant of communication resources indicates that the transport block be transmitted in consecutive TTIs based on satisfying the retransmission threshold.

Resources threshold manager 1440 may determine that a resources threshold is satisfied based on the retransmission threshold being satisfied, compare TTIs remaining in the transmission period to the resources threshold, where determining the resources threshold is satisfied is based on the comparison, and compare a second time duration remaining in the transmission period to the retransmission threshold, where identifying that the retransmission threshold is satisfied is based on the comparison.

Scheduling request manager 1445 may receive a scheduling request that requests communication resources for retransmitting the transport block. In some cases, the scheduling request includes an indication that the scheduling request is for a retransmission of the transport block.

Figure 15:
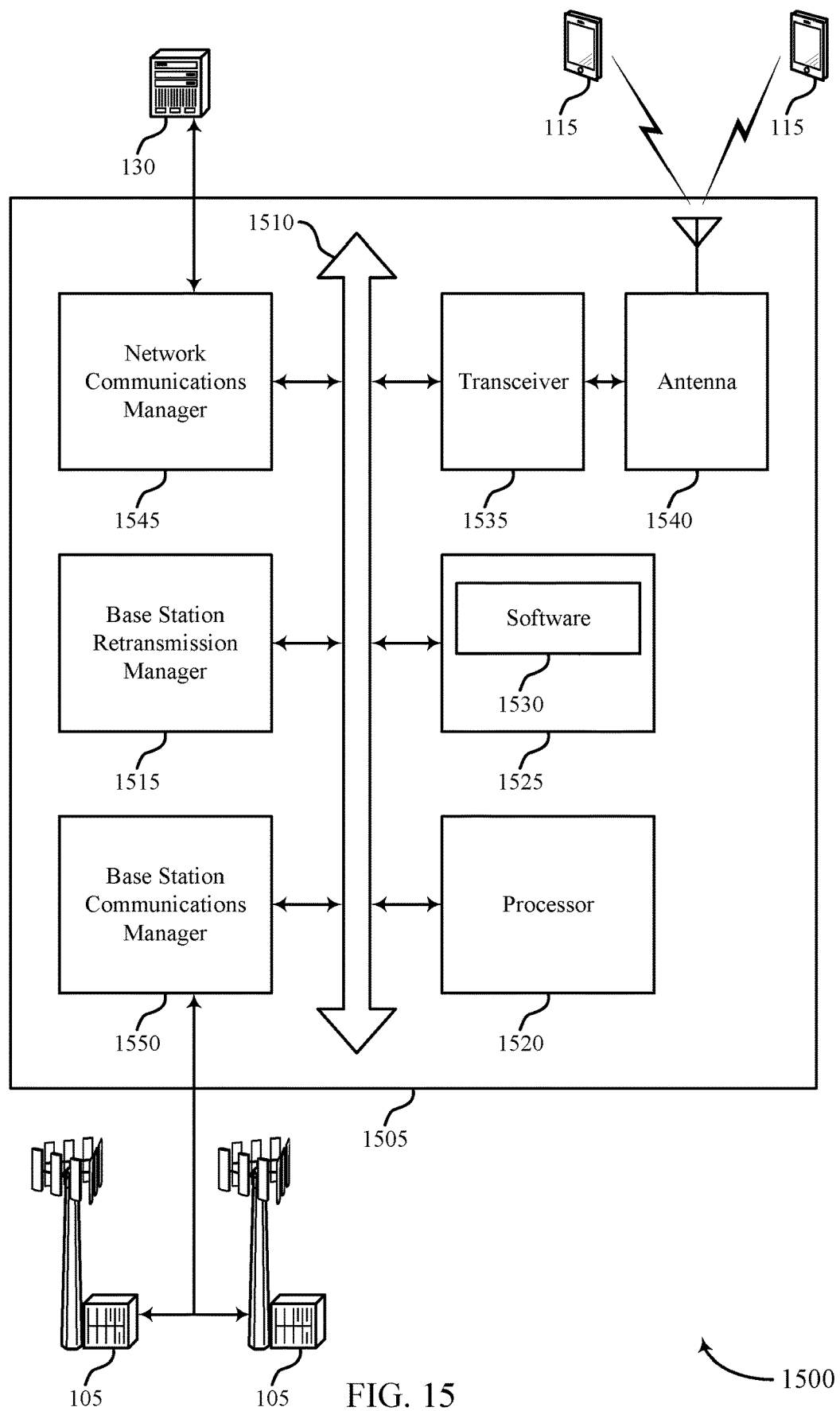
FIG. 15 illustrates a block diagram of a system including a UE that supports techniques to improve data transfer reliability in accordance with aspects of the present disclosure.

FIG. 15 shows a diagram of a system 1500 including a device 1505 that supports techniques to improve data transfer reliability in accordance with aspects of the present disclosure. Device 1505 may be an example of or include the components of wireless device 1205, wireless device 1305, or a base station 105 as described above, e.g., with reference to FIGS. 12 and 13. Device 1505 may include components for bi-directional voice and data communications including components for transmitting and receiving communications, including base station retransmission manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more user equipment (UE)s 115.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting techniques to improve data transfer reliability).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices.

Software 1530 may include code to implement aspects of the present disclosure, including code to support techniques to improve data transfer reliability. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
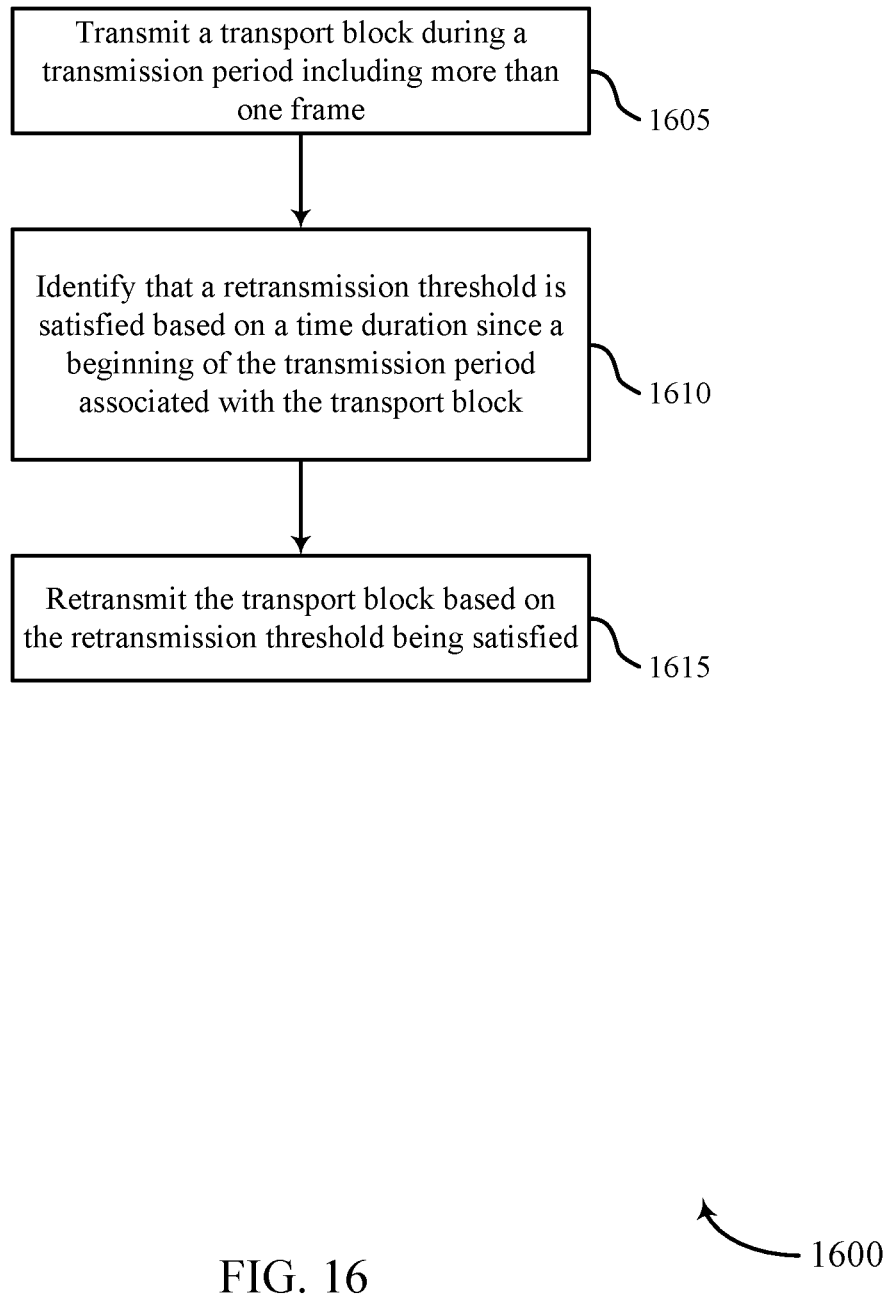
FIGS. 16 through 21 illustrate methods for techniques to improve data transfer reliability in accordance with aspects of the present disclosure.

FIG. 16 shows a flowchart illustrating a method 1600 for techniques to improve data transfer reliability in accordance with aspects of the present disclosure. The operations of method 1600 may be implemented by a UE 115 or its components as described herein. For example, the operations of method 1600 may be performed by a UE retransmission manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may transmit a transport block during a transmission period comprising more than one frame. The operations of block 1605 may be performed according to the methods described herein. In certain examples, aspects of the operations of block 1605 may be performed by a communication manager as described with reference to FIGS. 8 through 11.

At block 1610 the UE 115 may identify that a retransmission threshold is satisfied based at least in part on a time duration since a beginning of the transmission period associated with the transport block. The operations of block 1610 may be performed according to the methods described herein. In certain examples, aspects of the operations of block 1610 may be performed by a performance threshold manager as described with reference to FIGS. 8 through 11.

At block 1615 the UE 115 may retransmit the transport block based at least in part on the retransmission threshold being satisfied. The operations of block 1615 may be performed according to the methods described herein. In certain examples, aspects of the operations of block 1615 may be performed by a communication manager as described with reference to FIGS. 8 through 11.

Figure 17:
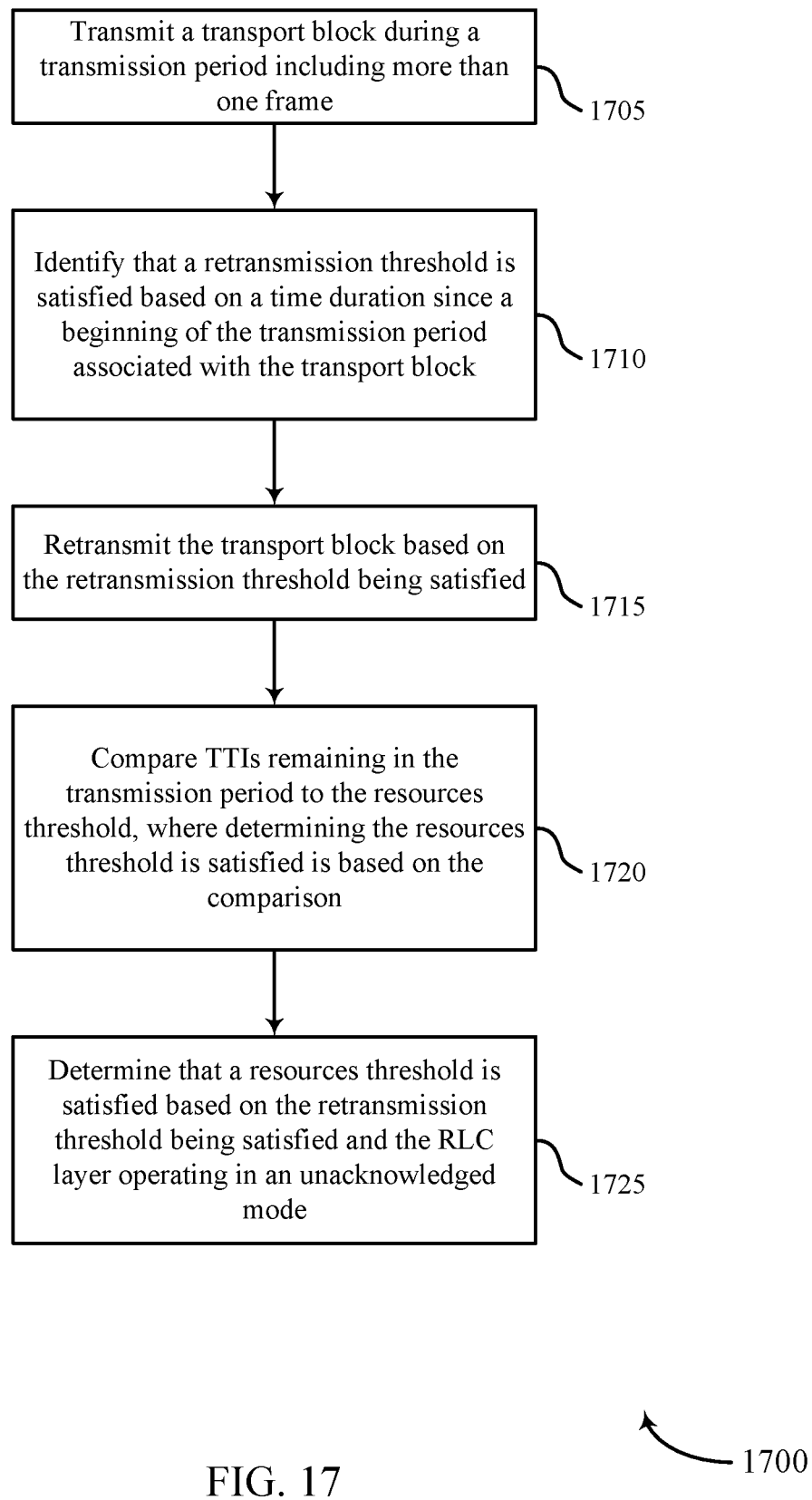

FIG. 17 shows a flowchart illustrating a method 1700 for techniques to improve data transfer reliability in accordance with aspects of the present disclosure. The operations of method 1700 may be implemented by a UE 115 or its components as described herein. For example, the operations of method 1700 may be performed by a UE retransmission manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may transmit a transport block during a transmission period comprising more than one frame. The operations of block 1705 may be performed according to the methods described herein. In certain examples, aspects of the operations of block 1705 may be performed by a communication manager as described with reference to FIGS. 8 through 11.

At block 1710 the UE 115 may identify that a retransmission threshold is satisfied based at least in part on a time duration since a beginning of the transmission period associated with the transport block. The operations of block 1710 may be performed according to the methods described herein. In certain examples, aspects of the operations of block 1710 may be performed by a performance threshold manager as described with reference to FIGS. 8 through 11.

At block 1715 the UE 115 may retransmit the transport block based at least in part on the retransmission threshold being satisfied. The operations of block 1715 may be performed according to the methods described herein. In certain examples, aspects of the operations of block 1715 may be performed by a communication manager as described with reference to FIGS. 8 through 11.

At block 1720 the UE 115 may compare TTIs remaining in the transmission period to the resources threshold, wherein determining the resources threshold is satisfied is based at least in part on the comparison. The operations of block 1720 may be performed according to the methods described herein. In certain examples, aspects of the operations of block 1720 may be performed by a resources threshold manager as described with reference to FIGS. 8 through 11.

At block 1725 the UE 115 may determine that a resources threshold is satisfied based at least in part on the retransmission threshold being satisfied and the RLC layer operating in an unacknowledged mode. The operations of block 1725 may be performed according to the methods described herein. In certain examples, aspects of the operations of block 1725 may be performed by a resources threshold manager as described with reference to FIGS. 8 through 11.

Figure 18:
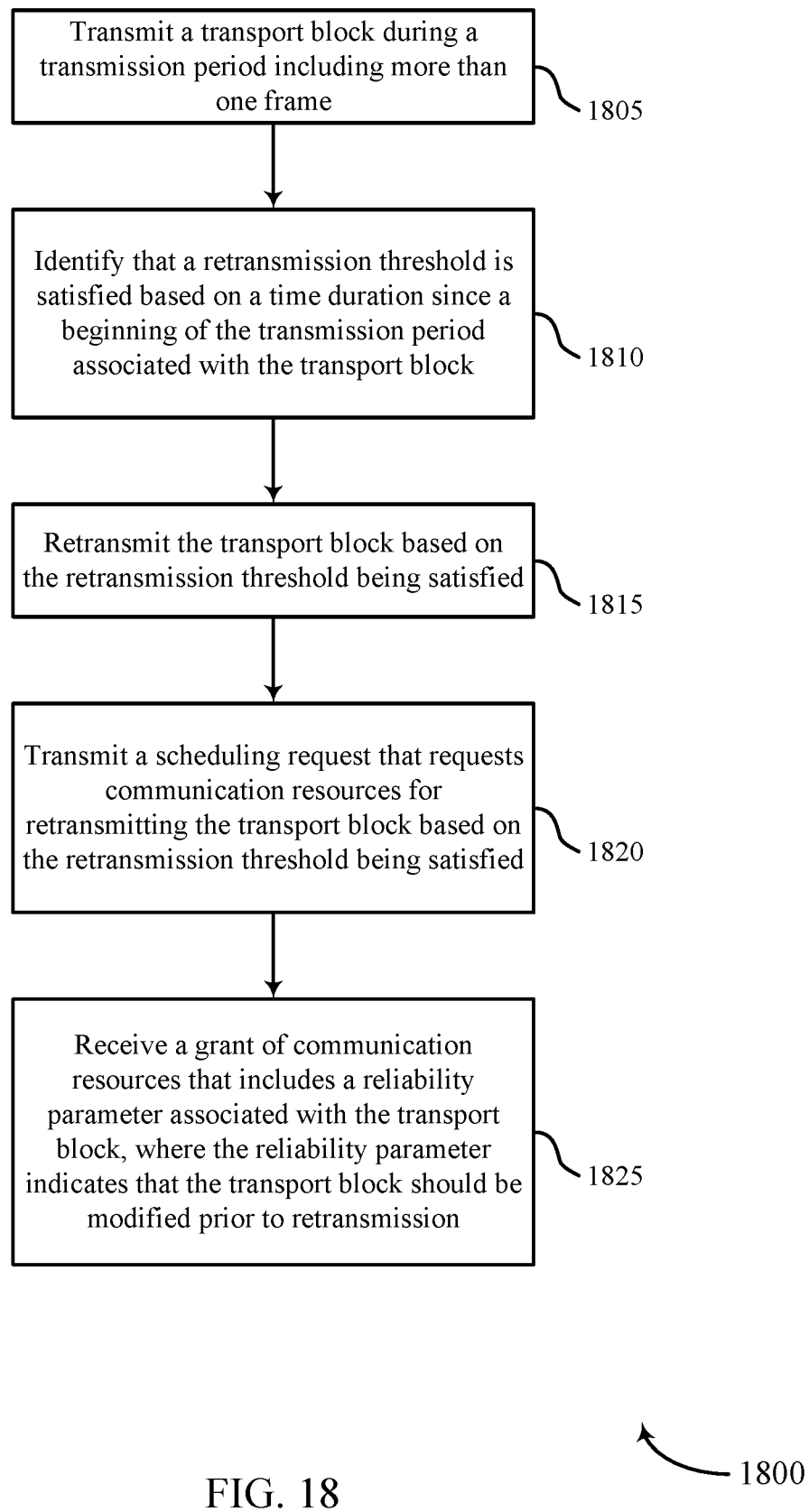

FIG. 18 shows a flowchart illustrating a method 1800 for techniques to improve data transfer reliability in accordance with aspects of the present disclosure. The operations of method 1800 may be implemented by a UE 115 or its components as described herein. For example, the operations of method 1800 may be performed by a UE retransmission manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may transmit a transport block during a transmission period comprising more than one frame. The operations of block 1805 may be performed according to the methods described herein. In certain examples, aspects of the operations of block 1805 may be performed by a communication manager as described with reference to FIGS. 8 through 11.

At block 1810 the UE 115 may identify that a retransmission threshold is satisfied based at least in part on a time duration since a beginning of the transmission period associated with the transport block. The operations of block 1810 may be performed according to the methods described herein. In certain examples, aspects of the operations of block 1810 may be performed by a performance threshold manager as described with reference to FIGS. 8 through 11.

At block 1815 the UE 115 may retransmit the transport block based at least in part on the retransmission threshold being satisfied. The operations of block 1815 may be performed according to the methods described herein. In certain examples, aspects of the operations of block 1815 may be performed by a communication manager as described with reference to FIGS. 8 through 11.

At block 1820 the UE 115 may transmit a scheduling request that requests communication resources for retransmitting the transport block based at least in part on the retransmission threshold being satisfied. The operations of block 1820 may be performed according to the methods described herein. In certain examples, aspects of the operations of block 1820 may be performed by a scheduling request manager as described with reference to FIGS. 8 through 11.

At block 1825 the UE 115 may receive a grant of communication resources that includes a reliability parameter associated with the transport block, wherein the reliability parameter indicates that the transport block should be modified prior to retransmission. The operations of block 1825 may be performed according to the methods described herein. In certain examples, aspects of the operations of block 1825 may be performed by a communication resources manager as described with reference to FIGS. 8 through 11.

Figure 19:
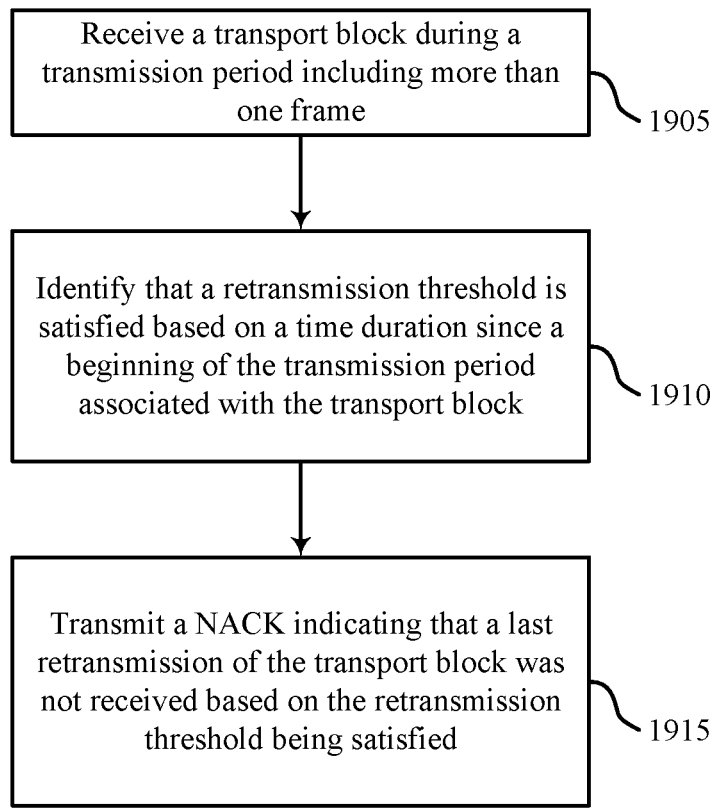

FIG. 19 shows a flowchart illustrating a method 1900 for techniques to improve data transfer reliability in accordance with aspects of the present disclosure. The operations of method 1900 may be implemented by a base station 105 or its components as described herein. For example, the operations of method 1900 may be performed by a base station retransmission manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may receive a transport block during a transmission period comprising more than one frame. The operations of block 1905 may be performed according to the methods described herein. In certain examples, aspects of the operations of block 1905 may be performed by a communication manager as described with reference to FIGS. 12 through 15.

At block 1910 the base station 105 may identify that a retransmission threshold is satisfied based at least in part on a time duration since a beginning of the transmission period associated with the transport block. The operations of block 1910 may be performed according to the methods described herein. In certain examples, aspects of the operations of block 1910 may be performed by a performance threshold manager as described with reference to FIGS. 12 through 15.

At block 1915 the base station 105 may transmit a NACK indicating that a last retransmission of the transport block was not received based at least in part on the retransmission threshold being satisfied. The operations of block 1915 may be performed according to the methods described herein. In certain examples, aspects of the operations of block 1915 may be performed by a negative acknowledgement manager as described with reference to FIGS. 12 through 15.

Figure 20:
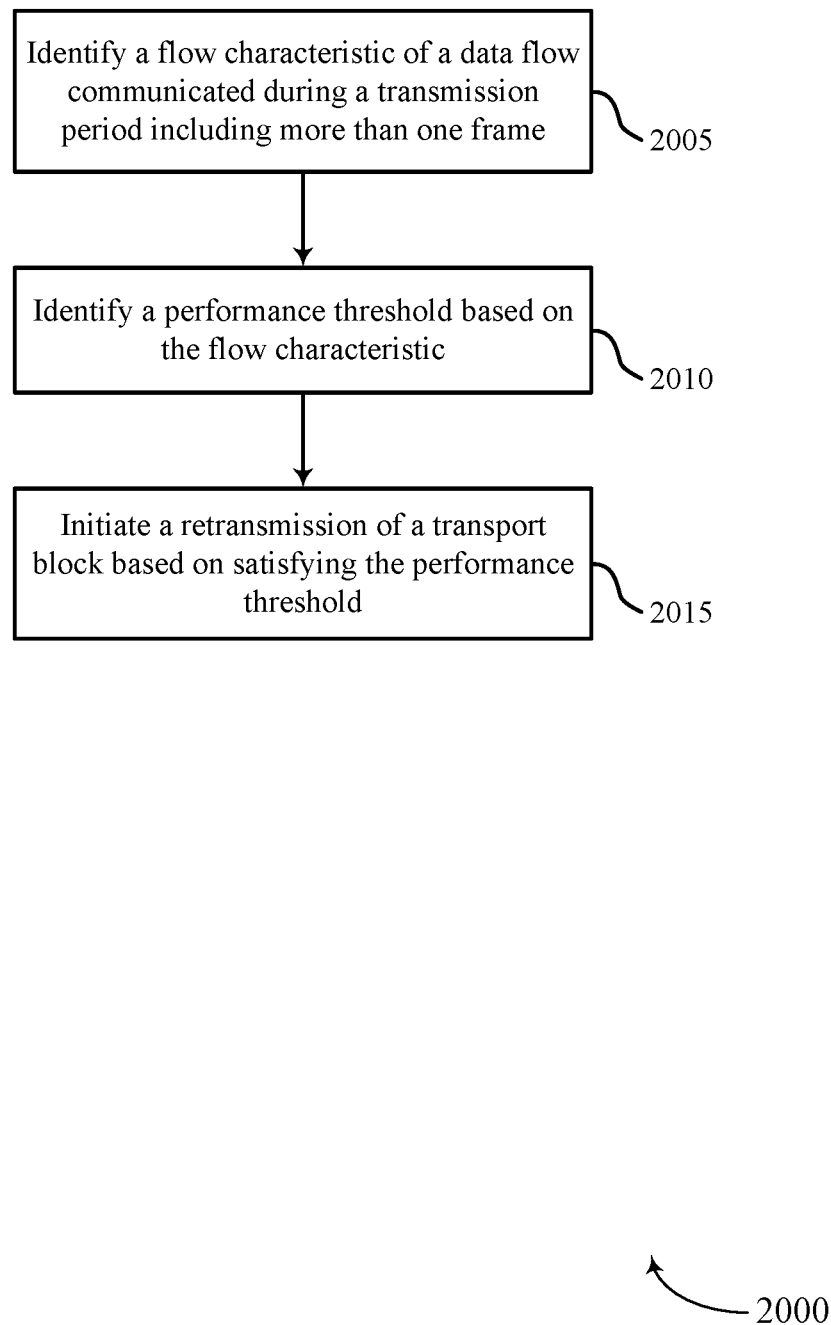

FIG. 20 shows a flowchart illustrating a method 2000 for techniques to improve data transfer reliability in accordance with aspects of the present disclosure. The operations of method 2000 may be implemented by a base station 105 or its components as described herein. For example, the operations of method 2000 may be performed by a base station retransmission manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify a flow characteristic of a data flow communicated during a transmission period comprising more than one frame. The operations of block 2005 may be performed according to the methods described herein. In certain examples, aspects of the operations of block 2005 may be performed by a communication manager as described with reference to FIGS. 12 through 15.

At block 2010 the base station 105 may identify a performance threshold based at least in part on the flow characteristic. The operations of block 2010 may be performed according to the methods described herein. In certain examples, aspects of the operations of block 2010 may be performed by a performance threshold manager as described with reference to FIGS. 12 through 15.

At block 2015 the base station 105 may initiate a retransmission of a transport block based at least in part on satisfying the performance threshold. The operations of block 2015 may be performed according to the methods described herein. In certain examples, aspects of the operations of block 2015 may be performed by a communication manager as described with reference to FIGS. 12 through 15.

Figure 21:
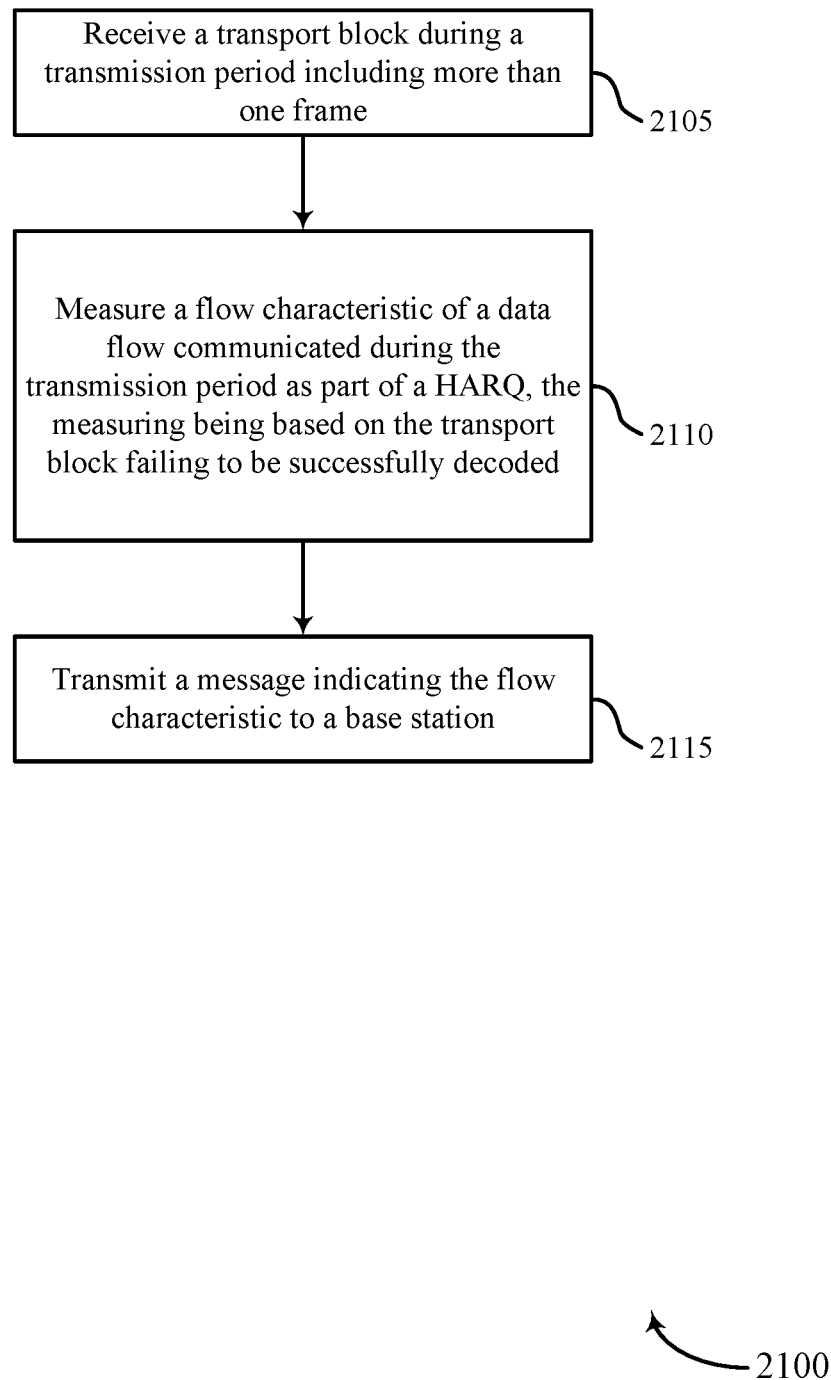

FIG. 21 shows a flowchart illustrating a method 2100 for techniques to improve data transfer reliability in accordance with aspects of the present disclosure. The operations of method 2100 may be implemented by a UE 115 or its components as described herein. For example, the operations of method 2100 may be performed by a UE retransmission manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may receive a transport block during a transmission period comprising more than one frame. The operations of block 2105 may be performed according to the methods described herein. In certain examples, aspects of the operations of block 2105 may be performed by a communication manager as described with reference to FIGS. 8 through 11.

At block 2110 the UE 115 may measure a flow characteristic of a data flow communicated during the transmission period as part of a HARQ, the measuring being based at least in part on the transport block failing to be successfully decoded. The operations of block 2110 may be performed according to the methods described herein. In certain examples, aspects of the operations of block 2110 may be performed by a communication manager as described with reference to FIGS. 8 through 11.

At block 2115 the UE 115 may transmit a message indicating the flow characteristic to a base station. The operations of block 2115 may be performed according to the methods described herein. In certain examples, aspects of the operations of block 2115 may be performed by a communication manager as described with reference to FIGS. 8 through 11.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting a transport block during a transmission period comprising more than one frame;
   identifying that a retransmission threshold is satisfied based at least in part on a time duration since a beginning of the transmission period associated with the transport block;
   receiving a grant of communication resources that includes a reliability parameter associated with the transport block and indicates that the transport block is to be transmitted in consecutive transmission time intervals (TTIs) based at least in part on the retransmission threshold being satisfied, wherein the reliability parameter indicates that the transport block should be modified prior to retransmission; and
   retransmitting the transport block based at least in part on the retransmission threshold being satisfied and according to the grant of communication resources.

2. The method of claim 1, further comprising:
   identifying that a radio link control (RLC) layer is operating in an unacknowledged mode.

3. The method of claim 1, wherein:
the retransmission threshold is satisfied after an allowed number of retransmissions of the transport block associated with a logical channel have failed.

4. The method of claim 1, further comprising:
adjusting a modulation and coding scheme of the transport block based at least in part on the retransmission threshold being satisfied.

5. The method of claim 1, further comprising:
retransmitting the transport block in the consecutive transmission time intervals (TTIs) based at least in part on the retransmission threshold being satisfied.

6. The method of claim 1, wherein:
the determining and the retransmitting is performed at a media access control (MAC) layer.

7. The method of claim 1, further comprising:
determining that a resources threshold is satisfied based at least in part on the retransmission threshold being satisfied and the RLC layer operating in an unacknowledged mode.

8. The method of claim 7, further comprising:
comparing transmission time intervals (TTIs) remaining in the transmission period to the resources threshold, wherein determining the resources threshold is satisfied is based at least in part on the comparison.

9. The method of claim 1, further comprising:
comparing a second time duration remaining in the transmission period to the retransmission threshold, wherein identifying that the retransmission threshold is satisfied is based at least in part on the comparison.

10. The method of claim 1, further comprising:
transmitting a scheduling request that requests communication resources for retransmitting the transport block based at least in part on the retransmission threshold being satisfied.

11. The method of claim 10, wherein:
the scheduling request includes an indication that the scheduling request is for a retransmission of the transport block.

12. The method of claim 1, wherein:
the grant of communication resources includes a new modulation and coding scheme associated with the transport block.

13. The method of claim 10, wherein:
a user equipment (UE) transmits the scheduling request to a base station.

14. The method of claim 1, further comprising:
identifying a second retransmission threshold that is greater than the retransmission threshold, wherein a number of unsuccessful retransmissions of the transport block satisfy the second retransmission threshold.

15. The method of claim 1, wherein:
the transport block is sent as part of a hybrid automatic-repeat-request (HARQ) procedure.

16. The method of claim 1, further comprising:
receiving, after identifying that the retransmission threshold is satisfied, a message indicating that a last retransmission of the transport block was not received by a recipient.

17. The method of claim 1, further comprising:
transmitting the transport block based at least in part on receiving a hybrid automatic-repeat-request (HARQ) negative acknowledgement (NACK) indicating that a previous transmission of the transport block was not received by a recipient.

18. A method for wireless communication, comprising:
receiving a transport block during a transmission period comprising more than one frame;
identifying that a retransmission threshold is satisfied based at least in part on a time duration since a beginning of the transmission period associated with the transport block; and
transmitting a negative acknowledgement (NACK) indicating that a last retransmission of the transport block was not received based at least in part on the retransmission threshold being satisfied, wherein the NACK is associated with a grant of communication resources generated after determining that the retransmission threshold is satisfied, and wherein the grant of communication resources indicates that the transport block be transmitted in consecutive transmission time intervals (TTIs) based at least in part on satisfying the retransmission threshold.

19. The method of claim 18, further comprising:
receiving a retransmission of the transport block after satisfying the retransmission threshold.

20. The method of claim 18, wherein:
the retransmission threshold is satisfied after an allowed number of retransmissions of the transport block associated with a logical channel have failed.

21. The method of claim 18, wherein:
the determining and the transmitting is performed by a media access control (MAC) layer.

22. The method of claim 18, further comprising:
determining that a resources threshold is satisfied based at least in part on the retransmission threshold being satisfied.

23. The method of claim 22, further comprising:
comparing transmission time intervals (TTIs) remaining in the transmission period to the resources threshold, wherein determining the resources threshold is satisfied is based at least in part on the comparison.

24. The method of claim 18, further comprising:
comparing a second time duration remaining in the transmission period to the retransmission threshold, wherein identifying that the retransmission threshold is satisfied is based at least in part on the comparison.

25. The method of claim 18, further comprising:
receiving a scheduling request that requests communication resources for retransmitting the transport block.

26. The method of claim 25, wherein:
the scheduling request includes an indication that the scheduling request is for a retransmission of the transport block.

27. The method of claim 18, wherein:
the grant of communication resources includes a new modulation and coding scheme associated with the transport block.

28. The method of claim 18, further comprising:
transmitting a hybrid automatic-repeat-request (HARQ) NACK based at least in part on being unable to decode the transport block transmitted by a remote source.

29. An apparatus for wireless communication, comprising:
a processor;
memory coupled with the processor; and
instructions stored in the memory and operable, when executed by the processor, to cause the apparatus to:
transmit a transport block during a transmission period comprising more than one frame;

identify that a retransmission threshold is satisfied based at least in part on a time duration since a beginning of the transmission period associated with the transport block;

receiving a grant of communication resources that includes a reliability parameter associated with the transport block and indicates that the transport block is to be transmitted in consecutive transmission time intervals (TTIs) based at least in part on the retransmission threshold being satisfied, wherein the reliability parameter indicates that the transport block should be modified prior to retransmission; and retransmit the transport block based at least in part on the retransmission threshold being satisfied and according to the grant of communication resources.

30. An apparatus for wireless communication, comprising:

a processor;

memory coupled with the processor; and instructions stored in the memory and operable, when executed by the processor, to cause the apparatus to:

receive a transport block during a transmission period comprising more than one frame;

identify that a retransmission threshold is satisfied based at least in part on a time duration since a beginning of the transmission period associated with the transport block; and transmit a negative acknowledgement (NACK) indicating that a last retransmission of the transport block was not received based at least in part on the retransmission threshold being satisfied, wherein the NACK is associated with a grant of communication resources generated after determining that the retransmission threshold is satisfied, and wherein the grant of communication resources indicates that the transport block be transmitted in consecutive transmission time intervals (TTIs) based at least in part on satisfying the retransmission threshold.

31. An apparatus for wireless communication, comprising:

means for transmitting a transport block during a transmission period comprising more than one frame;

means for identifying that a retransmission threshold is satisfied based at least in part on a time duration since a beginning of the transmission period associated with the transport block;

means for receiving a grant of communication resources that includes a reliability parameter associated with the transport block and indicates that the transport block is to be transmitted in consecutive transmission time intervals (TTIs) based at least in part on the retransmission threshold being satisfied, wherein the reliability parameter indicates that the transport block should be modified prior to retransmission; and means for retransmitting the transport block based at least in part on the retransmission threshold being satisfied and according to the grant of communication resources.

32. An apparatus for wireless communication, comprising:

means for receiving a transport block during a transmission period comprising more than one frame;

means for identifying that a retransmission threshold is satisfied based at least in part on a time duration since a beginning of the transmission period associated with the transport block; and means for transmitting a negative acknowledgement (NACK) indicating that a last retransmission of the transport block was not received based at least in part on the retransmission threshold being satisfied, wherein the NACK is associated with a grant of communication resources generated after determining that the retransmission threshold is satisfied, and wherein the grant of communication resources indicates that the transport block be transmitted in consecutive transmission time intervals (TTIs) based at least in part on satisfying the retransmission threshold.

33. A non-transitory computer readable medium storing code for wireless communication, the code comprising instructions executable by a processor to:

transmit a transport block during a transmission period comprising more than one frame;

identify that a retransmission threshold is satisfied based at least in part on a time duration since a beginning of the transmission period associated with the transport block;

receiving a grant of communication resources that includes a reliability parameter associated with the transport block and indicates that the transport block is to be transmitted in consecutive transmission time intervals (TTIs) based at least in part on the retransmission threshold being satisfied, wherein the reliability parameter indicates that the transport block should be modified prior to retransmission; and retransmit the transport block based at least in part on the retransmission threshold being satisfied and according to the grant of communication resources.

34. A non-transitory computer readable medium storing code for wireless communication, the code comprising instructions executable by a processor to:

receive a transport block during a transmission period comprising more than one frame;

identify that a retransmission threshold is satisfied based at least in part on a time duration since a beginning of the transmission period associated with the transport block; and transmit a negative acknowledgement (NACK) indicating that a last retransmission of the transport block was not received based at least in part on the retransmission threshold being satisfied, wherein the NACK is associated with a grant of communication resources generated after determining that the retransmission threshold is satisfied, and wherein the grant of communication resources indicates that the transport block be transmitted in consecutive transmission time intervals (TTIs) based at least in part on satisfying the retransmission threshold.

* * * * *